(12) United States Patent
Behera et al.

(10) Patent No.: US 10,193,783 B2
(45) Date of Patent: Jan. 29, 2019

(54) SYSTEM FOR AGGREGATING STATISTICS ASSOCIATED WITH INTERFACES

(71) Applicant: Nicira, Inc., Palo Alto, CA (US)

(72) Inventors: Somik Behera, San Francisco, CA (US); Henry Mai, Mountain View, CA (US)

(73) Assignee: NICIRA, INC., Palo Alto, CA (US)

(*) Notice: Subject to any disclaimer, the term of this patent is extended or adjusted under 35 U.S.C. 154(b) by 527 days.

(21) Appl. No.: 14/804,232

(22) Filed: Jul. 20, 2015

(65) Prior Publication Data

US 2016/0191361 A1  Jun. 30, 2016

Related U.S. Application Data

(60) Provisional application No. 62/099,098, filed on Dec. 31, 2014.

(51) Int. Cl.
*H04L 12/26* (2006.01)
*G06F 17/30* (2006.01)
*H04L 12/24* (2006.01)

(52) U.S. Cl.
CPC .... *H04L 43/0882* (2013.01); *G06F 17/30864* (2013.01); *H04L 41/142* (2013.01); *H04L 43/026* (2013.01); *H04L 43/0823* (2013.01); *Y02D 50/30* (2018.01)

(58) Field of Classification Search
CPC ..... H04L 43/062; H04L 43/026; H04L 43/04; H04L 45/586
See application file for complete search history.

(56) References Cited

U.S. PATENT DOCUMENTS

| | | | |
|---|---|---|---|
| 5,049,873 A | 9/1991 | Robins et al. | |
| 7,032,022 B1 | 4/2006 | Shanumgam et al. | |
| 7,206,861 B1* | 4/2007 | Callon | H04L 47/10 370/389 |
| 8,300,532 B1 | 10/2012 | Venkatramani et al. | |
| 2004/0258062 A1 | 12/2004 | Narvaez | |
| 2005/0129019 A1 | 6/2005 | Cheriton | |
| 2005/0132044 A1* | 6/2005 | Guingo | H04L 41/5009 709/225 |

(Continued)

FOREIGN PATENT DOCUMENTS

| | | |
|---|---|---|
| JP | 2005311863 A | 11/2005 |
| WO | 2005106659 A1 | 11/2005 |

OTHER PUBLICATIONS

OpenFlow Switch Specification; Feb. 28, 2011; Section A.2.3 (Year: 2011).*
Author Unknown, "Managing Your Network with HP OpenView Network Node Manager," Manufacturing Part No. J1240-90058, Mar. 2001, 299 pages, Hewlett-Packard Company. Part 1 of 2.

(Continued)

*Primary Examiner* — Ricky Quoc Ngo
*Assistant Examiner* — Stephen Nicholas Steiner
(74) *Attorney, Agent, or Firm* — Adeli LLP

(57) ABSTRACT

Some embodiments provide a statistics collection framework that is used to aggregate statistic for interfaces such as logical ports and logical port pairs. Flows that are related with these interfaces are tagged with the identifier of the logical entities for which statistics are being collected. The interface statistics is periodically sent in the background to a statistics aggregator. The read queries for the interface statistics are directed to the statistics aggregator. The statistics aggregator, therefore, acts as a cumulative cache for the interface statistics.

20 Claims, 16 Drawing Sheets

(56) References Cited

U.S. PATENT DOCUMENTS

| | | |
|---|---|---|
| 2005/0232230 A1 | 10/2005 | Nagami et al. |
| 2006/0028999 A1 | 2/2006 | Iakobashvili et al. |
| 2006/0282895 A1 | 12/2006 | Rentzis et al. |
| 2008/0298568 A1 | 12/2008 | Karandikar |
| 2009/0135834 A1 | 5/2009 | Guntur |
| 2011/0113136 A1* | 5/2011 | Phaal .................. G06F 11/3476 709/224 |
| 2012/0236734 A1 | 9/2012 | Sampath et al. |
| 2013/0205376 A1 | 8/2013 | Narasimha et al. |
| 2013/0258847 A1 | 10/2013 | Zhang et al. |
| 2013/0297768 A1 | 11/2013 | Singh |
| 2013/0329584 A1 | 12/2013 | Ghose et al. |
| 2013/0346592 A1 | 12/2013 | Kamble et al. |
| 2014/0281030 A1 | 9/2014 | Cui et al. |
| 2014/0325649 A1* | 10/2014 | Zhang ................... H04L 43/024 726/23 |
| 2015/0263974 A1 | 9/2015 | Jain et al. |
| 2015/0312117 A1 | 10/2015 | Behera et al. |
| 2015/0312118 A1 | 10/2015 | Behera et al. |

OTHER PUBLICATIONS

Author Unknown, "Managing Your Network with HP OpenView Network Node Manager," Manufacturing Part No. J1240-90058, Mar. 2001, 359 pages, Hewlett-Packard Company. Part 2 of 2.

Author Unknown, "AppLogic—Application Monitoring," Jul. 2007, 1 page, 3TERA, Inc.

Author Unknown, "AppLogic Features," Jul. 2007, 2 pages. 3TERA, Inc.

Author Unknown, "HP OpenView Network Node Manager SPI for IP Multicast software," May 2005, 6 pages, Hewlett-Packard Development Company.

Author Unknown, "SysUpTime User Manual," Mar. 18, 2007, 107 pages, version 3.5, iReasoning Inc.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

Phaal, Peter, et al., "sFlow Version 5," Jul. 2004, 46 pages, available at http://www.sflow.org/sflow_version_5.txt.

* cited by examiner

US 10,193,783 B2

SYSTEM FOR AGGREGATING STATISTICS ASSOCIATED WITH INTERFACES

CLAIM OF BENEFIT TO PRIOR APPLICATIONS

This application claims the benefit of U.S. Provisional Patent Application 62/099,098, filed Dec. 31, 2014. U.S. Provisional Patent Application 62/099,098 is incorporated herein by reference.

BACKGROUND

Network virtualization entails creating logical, virtual networks that are decoupled from the underlying network hardware to ensure the network can better integrate with and support increasingly virtual environments. In recent years, enterprises have been adopting network virtualization at a growing rate to take advantage of the flexibility of software-based compute.

Currently, the network virtualization platforms retrieve statistics for interfaces such as virtual network interfaces (VIFs), physical network interfaces (PIFs), tunnels, etc., on a hypervisor on demand. Such a mechanism for collecting statistics is slow and prevents the network virtualization platforms from presenting an application programming interface (API) that allows bulk retrieval of statistics. For instance, bulk queries such as "retrieve all interface statistics for the interfaces on a given hypervisor at once" or "retrieve all interface statistics for all the interface on all hypervisors at once" are slow and impractical to use.

BRIEF SUMMARY

Some embodiments provide a statistics collection framework that is used to aggregate statistic for interfaces. These embodiments periodically send the interface statistics, such as flow counter information, in the background to a statistics aggregator. The flow counter information is tagged with additional aggregation identification information that identifies the interface (or the logical entity) related to the flow. The aggregator updates the logical entity's statistics based on whether or not there was a discontinuity in the flow. Queries for the interface statistics are sent to the statistics aggregator. The response by the aggregator is fast because the aggregator already has the statistics when the queries come in, which eliminates the requirement to fetch statistics across multiple hypervisors at once. The statistics aggregator, therefore, acts as a cumulative cache for the interface statistics.

The statistics data can never be fully accurate because immediately after data retrieval, the data could change. Therefore, it is practical to just cache the statistics data and serving the data from the cache, rather than attempting to retrieve and present "real-time" statistics. The disclosed embodiments do not involve tagging the VIFs. Instead, a flow statistics exporter is used that queries an Open vSwitch (OVS) database for the relevant statistics and exports these statistics to a statistics aggregator.

The aggregator then performs a discontinuation detection routine to decide whether to use the incremental statistics data and add them to the total statistics for the interface, or to overwrite the existing baseline with the new data. The baseline for a given interface is always just one entry (the instance of the interface). In contrast, several flow baselines may exist for an infrastructure aggregate entity. The interface is a discrete element rather than being made up of several elements. This discrete element can be reset over time and the discontinuation detection decides whether to use the incremental statistics data or to overwrite the baseline statistics data.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
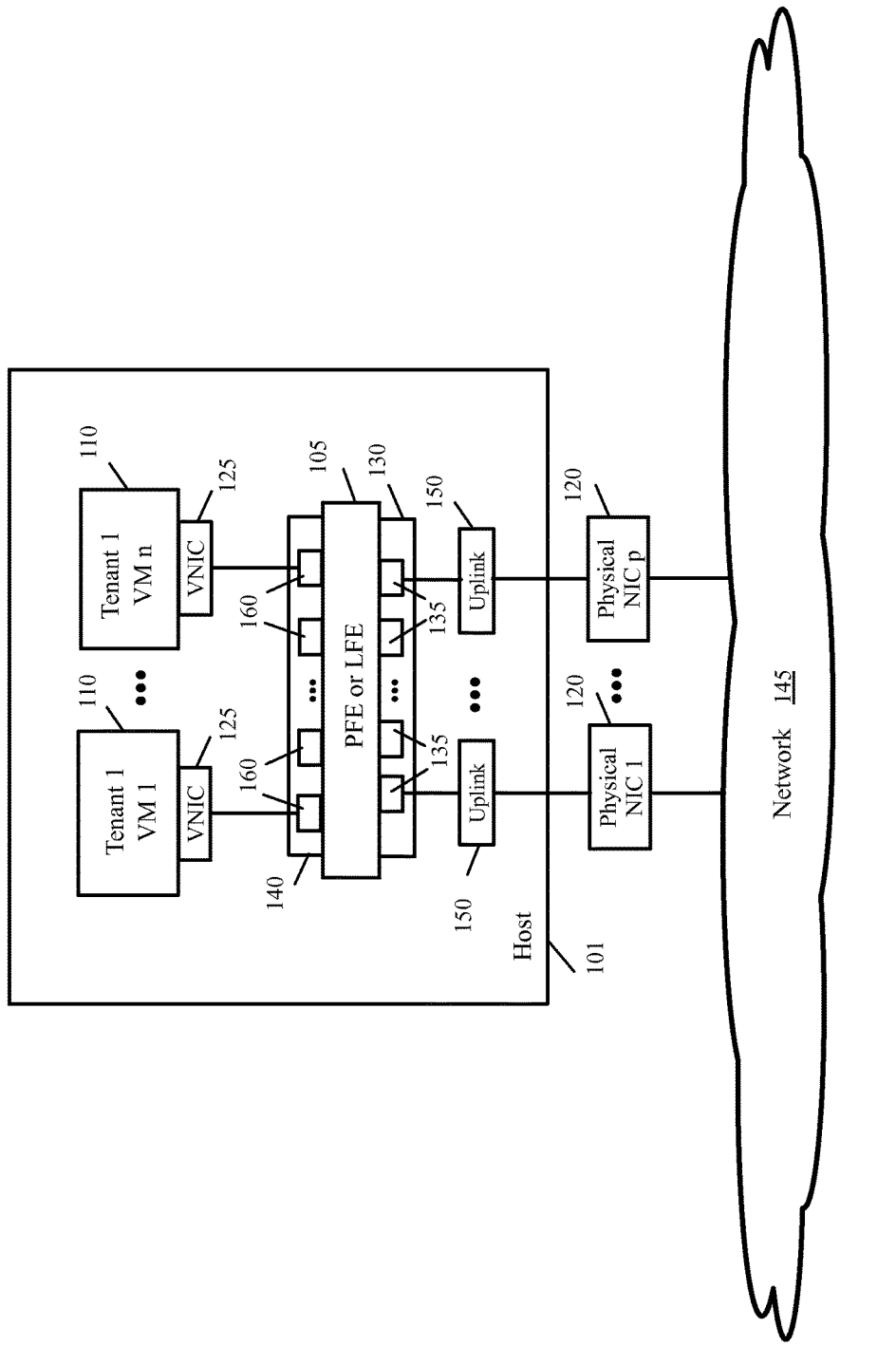
FIG. 1 conceptually illustrates a virtualized infrastructure domain in some embodiments of the invention.

Virtualization is the ability to simulate a hardware platform, such as a server, storage device or network resource, in software. A virtual machine (VM) is a software implementation of a machine such as a computer. FIG. 1 conceptually illustrates a virtualized infrastructure domain in some embodiments of the invention. The virtualized infrastructure domain is in some embodiments a virtualized infrastructure that is managed by a single cloud management system. The virtualized infrastructure domain includes a set of host machines 101. Each host can host one or more tenants, each tenant can have one or more VMs 110. In FIG. 1, one host and VMs 110 of one tenant are shown for simplicity. The host machines also host a set of services that provide different services. The term cloud service refers to services (such as computing, storage, etc.) provided in a distributed manner over a network.

The host 101 includes virtualization software (sometimes referred to as a hypervisor). The virtualization software is representative of the various types of virtualization software that may operate on hosts in such a virtualized infrastructure (e.g., virtual machine monitor, etc.). In some embodiments, this virtualization software includes one or more forwarding elements 105.

The VMs of each tenant form a logical network (also referred to as private network or virtual network). The logical network is identified by a logical network identifier (also known as virtual network identifier or VNI). Each logical network is configured by a tenant. The logical network is an abstraction of a physical network and may provide a virtual Layer 2 (Open Systems Interconnection (OSI) model Layer 2 (L2) or data link layer) for services such as encapsulation and decapsulation of network layer data packets into frames, frame synchronization, medial access control, etc. The logical network may span one or more physical networks and be organized independent of the underlying physical topology and organization of the physical networks.

In some embodiments, the forwarding element in the virtualization software is a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. A PFE forwards packets in a physical network whether or not it is implemented in software while a LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

In some embodiments, several PFEs are distributed throughout the network implement tenant's LFEs, where each PFE is a local instantiation, or a proxy, of an LFE that operate across different host machines and can perform L3 packet forwarding between VMs on the host machine or on different host machines. An LFE is sometimes referred to as a virtual distributed switch (VDS). In the following discussions, the term forwarding element refers to either a PFE or an LFE, depending on a particular configuration.

In each host 101, each forwarding elements 105 connects to one or more physical network interface controllers (PNICs) 120 to send outgoing packets and to receive incoming packets through a physical network 145. As shown, a forwarding element 105 in FIG. 1 is defined to include one or more ports 135 (or a port group 130) through which it connects to uplinks 150 and the physical NICs 120 to send and receive packets.

A forwarding element 105 is also defined to have a set of virtual ports 160 (or a virtual port group 140) to connect to VMs 110 through virtual NICs (VNICs) 125 to the forwarding element 105. A port group is a group of ports that have the same configuration. An uplink 150 is a module that relays packets between the forwarding element 105 and the physical NIC 120 in order to perform various packet processing functions on incoming and outgoing traffic.

Some embodiments provide a system that implements a set of tools to define a scalable framework to provide statistics for the interfaces such as logical ports of each logical forwarding element. These embodiments tag the flows with logical port information (e.g., metadata that identifies the logical port), send the statistics to an aggregator that stores the statistics for each particular logical port. For instance, some embodiments allows a network administrator to retrieve a total packet count and byte count for each particular logical port of a logical forwarding element, even though the logical ports may be distributed across multiple physical forwarding elements.

Figure 2:
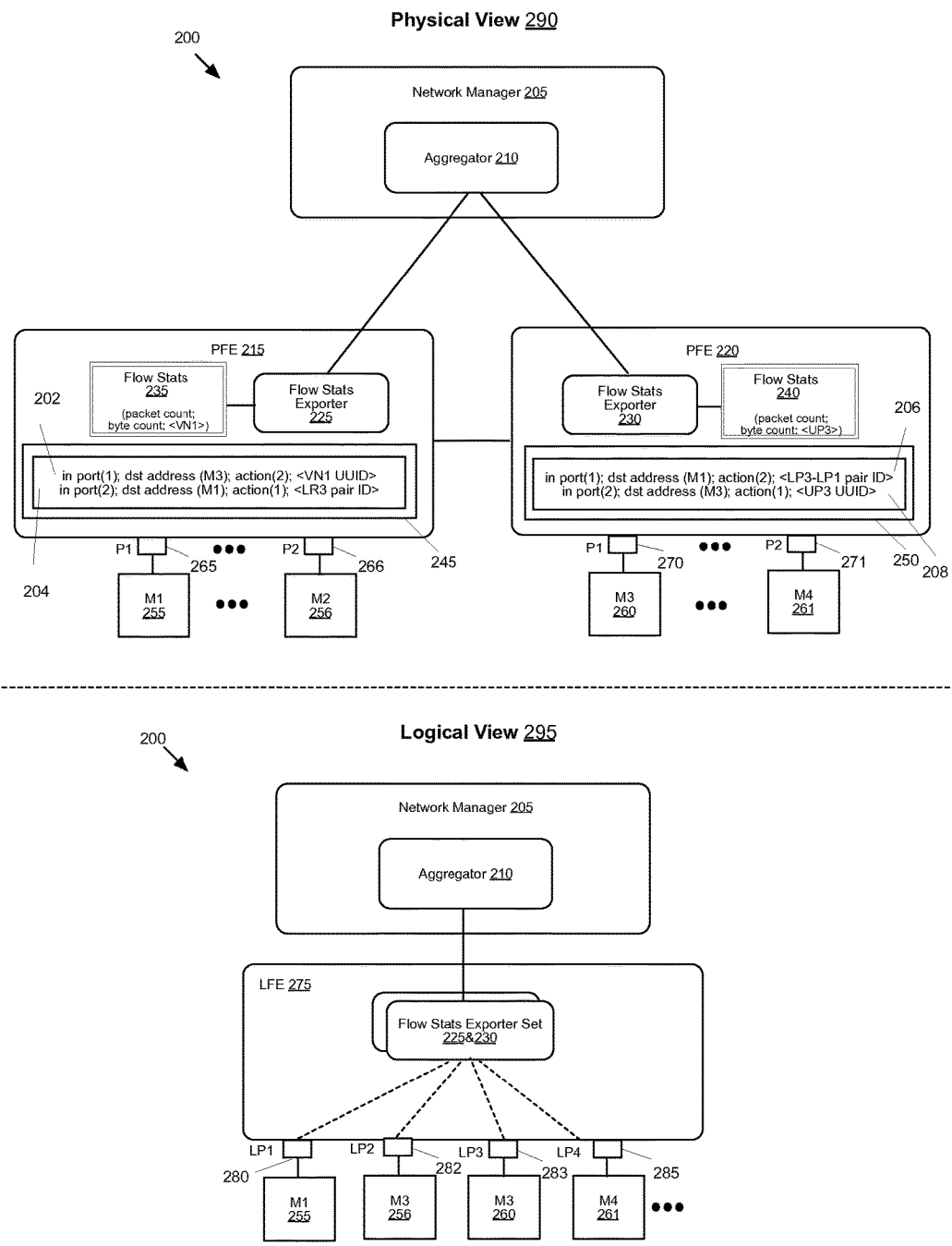
FIG. 2 illustrates a system for retrieving statistics relating to logical ports of a logical forwarding element.

FIG. 2 conceptually illustrates a system 200 that aggregates statistics relating to each individual interface connected to a logical port of a logical forwarding element (LFE). Instead of aggregating statistics for the forwarding element, the statistics are aggregated for individual interfaces (such as VNICs, uplinks, logical routers, etc.) that are identified by tagging the flows (or rules) for each interface. A logical router is used to forward L3 packet between VMs of a logical network. In some embodiments, a logical router operates across the host machines of its logical network as a virtual distributed router (VDR). A VDR provides a one-hop routing that enables a packet to be sent between two LFEs without going through a gateway. U.S. patent application Ser. No. 14/137,862, filed on Dec. 20, 2013, now published as U.S. Pat. No. 9,785,455, entitled Logical Router, provides further details about a VDR. The content of U.S. patent application Ser. No. 14/137,862, now published as U.S. Pat. No. 9,785,455, is incorporated herein by reference. FIG. 2 conceptually shows in two different views, a physical view 290 and a logical view 295, how the system 200 accumulates the statistics. The physical view 290 shows a network manager 205 and several physical forwarding elements (PFEs) 215 and 220. The network manager 205 is also shown in the logical view 295 along with the LFE 275 that is constructed from the PFEs.

The PFE (215 or 220) is a component of the system 200 that processes packets for one or more machines (also referred to herein as network hosts). A machine can be a virtual machine (VM) or a physical machine (e.g., a dedicated machine, a physical NIC, etc.). The term "packet" is used herein refer to a collection of bits in a particular format that is sent across a network. Typically, the packet includes header, user data, and a trailer. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The innermost header is usually the last header of the headers before the payload of the packet. For the network that implements the protocol of the outer-most header of a packet, the network considers only the outer-most header of the packet as the header and the other headers and the user data of the packet are together considered as the payload of the packet. One of ordinary skill in the art will recognize that the term "packet" may be used herein to refer to various formatted collections of bits that may be sent across a network, such as Ethernet frames, TCP segments, UDP datagrams, IP packets, etc.

The PFE (215 or 220) can be an OSI Layer 2 switch or a Layer 3 router, in some embodiments. The PFE of some embodiments is a hardware forwarding element or a software forwarding element. The hardware forwarding element has application-specific integrated circuits (ASICs) that are specifically designed to support in-hardware forwarding. Different from a hardware forwarding element, the software forwarding element may operate on an x86 box or a computing device (e.g., a host machine or a hypervisor). The term "physical forwarding element" is used herein to differentiate it from a logical forwarding element. In other words, the term "physical" forwarding element is not used herein to differentiate a hardware forwarding element from a software forwarding element.

In some embodiments, the PFEs 215 and 220 are edge forwarding elements or tunnel endpoints. An edge forwarding element represents a last forwarding element before a set of one or more end machines. The edge forwarding element is directly connected to the set end machine. As such, the edge forwarding element has an advantage over a non-edge forwarding element in accumulating statistics for the set of end machines. That is, the edge forwarding element can more easily monitor traffic coming from and going to an end machine than the non-edge forwarding element. This is particular useful in cases where the system 200 accumulates statistics for an aggregated entity, such as a machine or a group of machines.

In the example of FIG. 2, the PFEs 215 and 220 operate in conjunction with one another to collectively implement the LFE 275. The PFEs 215 and 220 may implement multiple LFEs (e.g., logical switches or logical routers) for different logical networks of different tenants, users, departments, etc. that use the same shared computing and networking resources. To simply the description, only two PFEs are shown in the figure, but there can be additional PFEs that implements the LFEs. Conceptually, a single PFE can be used to define multiple LFEs. For instance, one router can be partitioned into multiple different logical routers to provide network services for different tenants.

The physical view 290 also shows machines (255-261). Each machine is connected to a port 265-271 of a PFE 215-220. Depending on the PFE and its supported features, the port may be an actual physical port (e.g., to plug a machine into) or a virtual port. Irrespective of whether the port is physical or virtual, it will now be referred to as a "physical" port to differentiate it from a logical port. The machines can be VMs, physical machines, physical NICs, etc.

To process packets, the PFE (215 or 220) of some embodiments maintains a number of flows in a flow table, memory (e.g., content-addressable memory (CAM) or ternary CAM (TCAM)), or a datapath cache (245 or 250). Each flow is essentially a rule that specifies how the PFE should process each packet with certain header field values. The flow includes a set of match fields and at least one action to perform on each packet that has a set of header values that match the set of match field values. Typically, the action specifies dropping the packet or outputting the packet to one or more of the PFE's output ports. For instance, when the PFE 215 receives a packet, it performs a packet classification operation (e.g., a hash-based lookup operation) to find a matching flow from the datapath cache 245, and outputs the packet to a particular port (e.g., port 1 or port 2) according to the matching flow's action.

In addition, the flows that relate to an interface (such as a VNIC, an uplink, a logical router, a VDR, etc.) or the ports associated to an interface (such as logical port or a physical port) are tagged to identify the interface. In addition, pairs of interface, ports, or an interface and a port are tagged in some embodiments. A tag provides additional aggregation identifier (ID) information. An aggregation ID can be, e.g., an OSI Layer 4 logical port universally unique identifier (UUID) or other identifiers of a VNIC, an uplink, a logical router, etc. The aggregation ID can also be the identifier of other logical entities. For instance, a logical entity can be a pair of interfaces, a pair including an interface and a port, or a pair of ports. The aggregation ID is used to identify the statistics for packets going for one of the entities to the other entity (i.e., going in a particular direction from a source entity to a destination entity). As described further below, the statistics is then collected at an aggregator and the statistics of each individual interface is updated.

For each flow, the PFE (215 or 220) of some embodiments maintains statistics. Examples of such statistics include packet count and byte count. In some embodiments, the packet count is a total count of the number of packets that were processed (e.g., sent or received) with a given flow. The byte count of some embodiments is the total number of bytes processed (e.g., sent or received) with the given flow. The PFE of some embodiments also maintains other information relating to each flow. As an example, the PFE may maintain the duration of the flow. The PFE of some embodiments also maintains a timestamp of when the flow was last used to process a packet. The timestamp may be used to dump the flow from the datapath cache if the flow has not been used for a specified period of time. If the same flow is added again to the datapath cache, the statistics associated with the flow will be reset, in some embodiments.

To accumulate statistics, the system 200 includes at least one flow stats (statistics) exporter (225 or 230) and an aggregator 210. A flow stats exporter is implemented on each PFE that participates in the accumulation of the statistics. The flow stats exporter of some embodiments sends flow statistics to the aggregator periodically or when triggered. In some embodiments, the flow stats exporter dumps flow statistics in a set timed interval. For instance, the flow stats exporter may send flow statistic to the aggregator each second, some millisecond, or some other set time period. In some embodiments, the flow stats exporter can be configured to export at a specified time interval. That is, a network administrator can input into the system 200 a time interval that the flow stats exporter (225 or 230) uses to export the statistics in a periodic basis. Alternatively, the flow stats exporter of some embodiments is hard-coded with a time interval (e.g., default time interval).

In some embodiments, the flow stats exporter (225 or 230) exports to the aggregator 210 only flow statistics of each flow that is associated with a particular piece of metadata (or a tag). As an example, the PFE 215 may have many flows in the datapath cache 245 at some point in time, and the flow stats exporter 225 may only dump statistics of flows (e.g., the flows 202 and 204) that are associated with a tag. The flow stats exporter may also dump stats of all the different flows that are associated with different tags. To support the stats aggregation, the PFE stores the statistics of each flow along with a set of one or more tags associated with that flow.

The aggregator 210 of some embodiments is a component of the system that (1) receives statistics from one or more flow stats exporters, and (2) stores the statistics in a storage. The storage is a database, in some embodiments. Rather than simply storing the statistics, the aggregator accumulates or aggregates the statistic. This means that for a given entity or a given aggregated entity, the aggregator initially stores the statistics and then updates the statistics with each stats report from a flow stats exporter. As an example, when the initial report has a value x for the packet count and a subsequent report has a value y, the aggregator may update the initial statistics by adding the delta or difference (y-x) between those two values.

In addition, the aggregator 210 utilizes the tags that identify individual interfaces to maintain statistics for each individual interface. In some cases, there can be discontinuity between a current report and the aggregated stats. For instance, a stats counter of a flow may have went backwards, duration of the flow in the current report is less that the duration from the previous report, and/or the start time of the flow is off. Several such examples of detecting discontinuity will be described in detail below.

In some embodiments, the aggregator 210 is also used to retrieve statistics from the storage. For instance, when there is a request for statistic relating to an interface, a logical port, or an aggregated entity, the aggregator in some such embodiments queries the storage to retrieve the requested statistics. Alternatively, the system 200 of some embodiments separates the statistics aggregation from the statistics retrieval. In other words, the system can include separate components that perform the aggregation and the retrieval.

The network manager 205 of some embodiments is used to manage and configure the PFEs 215 and 220. The network manager may perform the management by sending (e.g., pushing) management data (e.g., bridge information, LFE information, virtual interface information, tunnel information, etc.) to the PFEs. The network manager of some embodiments performs the configuration by sending (e.g., pushing) flows to the PFEs. Instead of sending flows, the network manager 205 of some embodiments exchanges forwarding state information that is translated into a set of flows at the PFEs.

In the example of FIG. 2, the aggregator 210 is shown as being implemented on the same computing device as the network manager 205. However, the aggregator can be implemented on any machine, virtual or dedicated. As an example, the aggregator can be implemented as a part of the virtualization software, a service VM, a separate statistics aggregating machine, etc. The aggregator can also be implemented on the same device as the virtualization software or virtual forwarding element (e.g., the PFE 215 or 220). The aggregator can be an application or a plug-in component that runs on a particular operating system.

Different from the physical view 290, the logical view 295 shows the LFE 275. In some embodiments, the LFE is defined to create a virtual network for several network hosts that are related to one another. The network hosts may be related because they belong to (or used by) the same user, department, tenant, or enterprise. The LFE is defined at least partially by several flows that allow the related network hosts to communicate with one another. In some embodiments, the LFE is also defined by a logical forwarding element identifier (LFEID) that is added to headers of packets belong to one entity, such as a user, department, tenant, or enterprise. The LFEID is also referred to as a tenant identifier, a network identifier, a virtual extensible local area network (VXLAN) identifier, or a tunnel key, in some embodiments. The virtual LAN (VLAN) tag is used as the LFEID in some embodiments.

Having described the components of the system 200, example operations of the system will now be described by reference to the physical and logical views 290 and 295 that are illustrated in FIG. 2. The physical view 290 shows the network manager 205, the PFEs (215 and 220), and the machines (255 and 260). Machines 255-261 are connected to ports 265-271 of the PFEs 215-220. Depending on the PFE and its supported features, the port may be an actual physical port (e.g., to plug a machine into) or a virtual port. Irrespective of whether the port is physical or virtual, it will now be referred to as a "physical" port to differentiate it from a logical port.

The physical view 290 also shows that the network manager 205 has sent flows 202-208 or instructions that are translated to flows to the PFEs 215 and 220. Specifically, the PFE 215 is configured with two flows 202 and 204 to process packets associated with machine 255 while, PFE 220 is configured with two other flows 206 and 208 to process packets associated with machine 260. The two flows 202 and 204 in datapath cache 245 of the PFE 215 are used to process inbound and outbound traffic associated with the machine 255. That is, the flow 202 is used to forward packets from the machine 255 to the machine 260, and the flow 204 is used to forward packets from the machine 260 to the machine 255. The PFE 220 shows similar flows 206 and 208; however, they are defined for the machine 260.

The physical view 290 also shows that the flows 202-208 are tagged in some manner to identify different interfaces or different logical ports. In particular, the flow 202 is tagged with UUID of VNIC 1 (VN1 UUID), flow 204 is tagged with an identifier of a logical router (LR3 UUID), flow 208 is tagged with the ID of uplink 3 (UP3 ID), and flow 206 is tagged with an identifier (LP3-LP1 pair ID) that identifies the pair of logical ports 3 and 1 (from the direction of LP3 to LP1). The tag's value can be an aggregation identifier or can be any other value that that has meaning within the system to collect statistics.

In some embodiments, the system tracks both inbound and outbound traffic of ports (e.g., logical or physical ports) and interfaces by using a counter index. For instance, the counter index of 0 can be for inbound data and 1 for outbound data. However, in some embodiments, the counter index is opaque to the system except for the network manager (e.g., the NVP controller described below). That is, the controller could have chosen anything for the counter indices. In some embodiments, the counter index is also limited to the range of 0 to 255. The range can be larger if necessary, in some embodiments. Additionally, since the counter index is opaque to the system of some embodiments, for access control lists (ACLs), the same 0 and 1, can represent allow and deny traffic, respectively. This is because the network manager (e.g., the NVP controller) understands what UUIDs correspond to what kind of entity they are. Thus, the network manager understands the counter indices for the different types of entities (e.g., logical port, port pairs, ACLs, VNICs, uplinks, logical routers, interface pairs, interface and port pairs, etc.).

In the physical view 290, the flow stats exporter 225 operates on the PFE 215 to read flow statistics 235 from storage (e.g., memory) and send the statistics to the aggregator 210. Likewise, the flow stats exporter 230 operates on the PFE 220 to read flow statistics 240 from storage and send the statistics to the aggregator 210. As mentioned above, each flow stats exporter (225 or 230) may send the statistics in a periodic basis or when triggered. The aggregator 210 operates on the network manager 205 to accumulate statistics from the flow stats exporters 225 and 230. As described above, some of the flows that are related to interface entities such as logical ports or logical port pairs include additional tags to identify those entities.

The logical view 295 shows the LFE 275 that is implemented by the PFEs 215 and 220. The machines 255-261 and their associated interfaces are conceptually shown as being attached to logical ports one to four 280-285 of the LFE 275. The LFE 275 is associated with the flow stats exporter set 225 and 230. The exporter set sends flow statistics and any updates to the aggregator 210. The flow statistics relate to the interface connected to logical ports one to four of the LFE. The dashed arrow, shown between the flow stats exporter set 225 and 230 and each logical port (280-285), indicate that interface and logical port statistics are collected through the tagged flow statistics (235 and 240).

There are several reasons why statistics relating to such interfaces and logical ports are derived indirectly through flow statistics. One of the main reasons is because the LFE 275 is a logical construct that is defined by its flows. Another reason is that the logical ports 280 and 285 of the LFE 275 are logical constructs that do not exist in the real world. As mentioned above, in the worst-case scenario, the logical ports may be distributed across every PFEs that implements the LFE. In some embodiments, a logical port can correspond to different entities such as an individual physical port, an active-standby port pair used when a VM is being moved from one host to another, a distributed Layer 2 port, or a distributed Layer 3 port such as a logical port of a Layer 3 router (which correlates to multiple Layer 2 ports).

In the example of FIG. 2, the logical ports 280-285 are distributed across the PFEs 215 and 220. Also, some logical port numbers of the LFE 275 do not match the physical port numbers of the PFEs. For instance, logical port 4 285 (LP4) of LFE 275 may correspond to physical port 2 271 of PFE 220. Accordingly, the system of some embodiments provides an easy means to quickly retrieve logical port stats without having to identify which physical ports corresponds to which logical ports.

Figure 3:
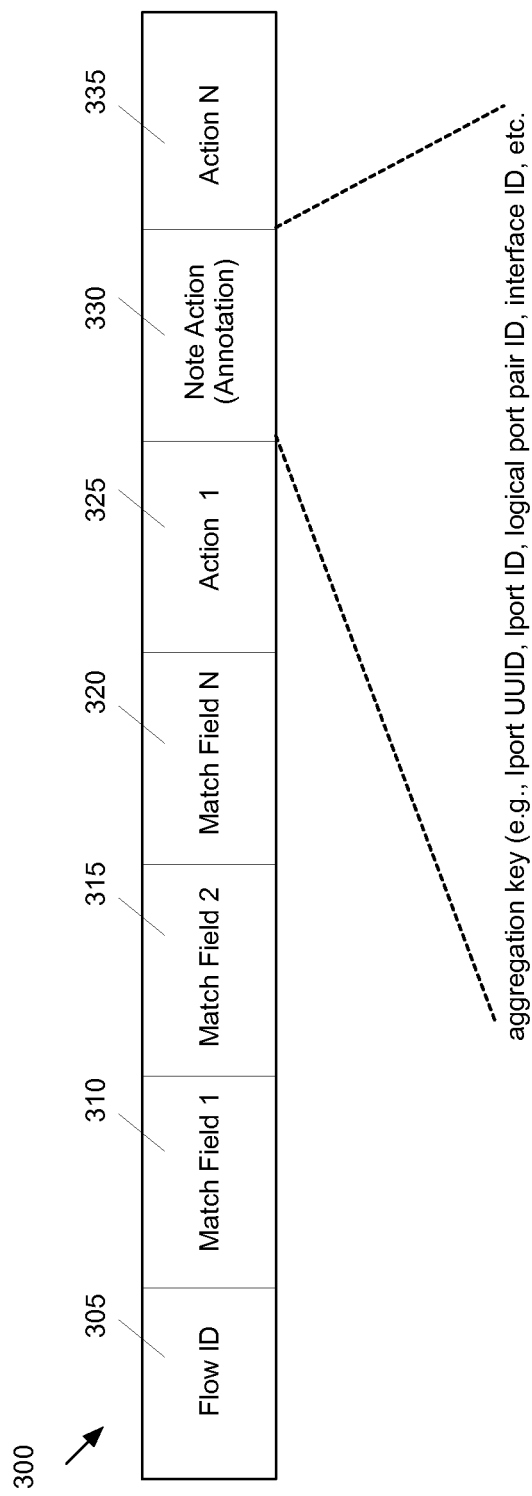
FIG. 3 illustrates an example of a flow entry that is associated with metadata to facilitate stats collection.

FIG. 3 conceptually illustrates an example of a flow entry 300 that is associated with metadata to facilitate stats collection. As shown, the flow entry 300 includes a flow identifier 305 to identify the flow. The flow entry 300 can include one or more match fields 310-320. The flow entry can include one or more actions 325-335. If the flow entry is to be used for stats collection, then the flow entry should be associated with at least one piece of metadata.

In the example of FIG. 3, the metadata is associated the flow using a special type of action called a note action. This note action feature has existed in previous versions of the Open vSwitch (OVS). In the past, the note action did nothing at all (i.e., it is a "no op" action), except associate the note with the flow. The framework of some embodiments incorporates this existing tagging component to annotate flows. That is, the scalable framework of some embodiments includes this existing tagging component. However, instead of leveraging an existing feature, the scalable framework in some embodiments may provide another tagging component to annotate flows.

Each note action 330 can include one or more tags. In other to relate a flow with an interface (such as a VINC, an uplink, a logical router, a VDR), a pair of entities (such as pair of interfaces, a pair of ports, a pair of one interface and one port), or a switching entity (such as a logical port or a physical port), the flow includes a tag that identifies the interface, the pair of entities, or the switching entity. In particular, the tag can be a logical port UUID, other identifiers of a logical port, a logical port pair identifier, an interface identifier, or any other information that identifies an interface, a pair of entities, or a switching entity. Other information such as a counter type (e.g., 0 for ingress, 1 for egress), type information (interface stats, logical port stats or otherwise), a version number, etc. can also be included. The note action 330 can be used to tag a flow in any manner with one or more of various tags in order to facilitate the collection of statistics. In some embodiments, the flow can include multiple note actions. If there are multiple note actions, the flow stats exporter may export the same stat multiple times. Of course, this depends on how the flow stats exporter is implemented. In some embodiments, any number of bytes represented as hex digits (e.g., hh) may be included in the note action. Pairs of hex digits may be separated by periods for readability. In some embodiments, the note action's format does not include an exact length for its payload, so the provided bytes will be padded on the right by enough bytes with value zero to make the total number six more than a multiple of eight.

Figure 4:
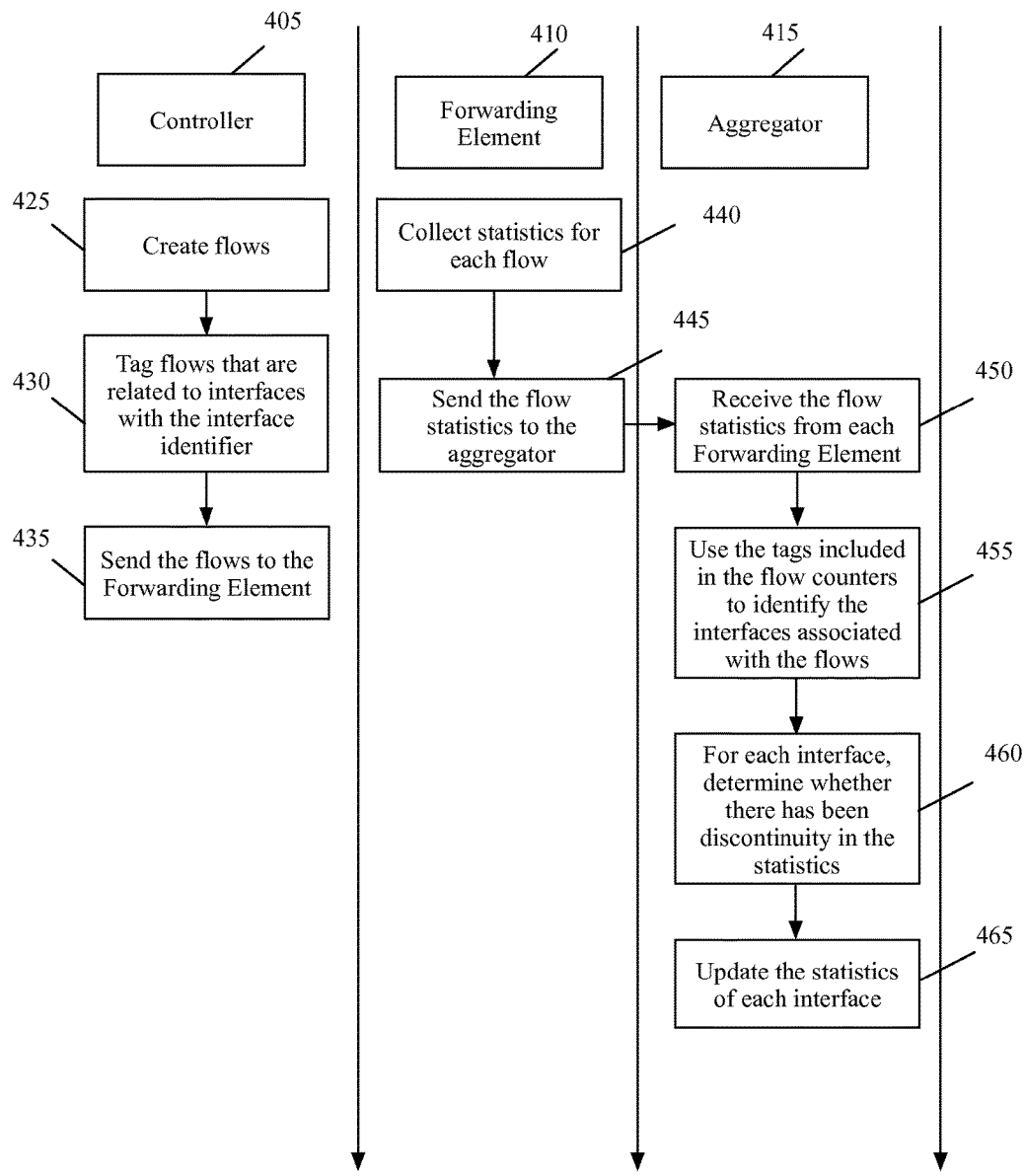
FIG. 4 is a swim lane diagram that conceptually illustrates different actions by the controller, an LFE, and the aggregator for collecting statistics for a logical interface.

FIG. 4 is a swim lane diagram that conceptually illustrates different actions by the controller, a forwarding element (e.g., a PFE or LFE), and the aggregator for collecting statistics for a logical interface. As shown, the controller 405 creates (at 425) the flows. For instance, a user or an administrator uses an API to define different fields of a flow. As a part of the flow creation, the controller also tags (at 430) the flows that are related to interfaces with the corresponding interface identifiers. The controller then sends (at 435) the flows to the forwarding element.

As the packets arrive, the forwarding element 410 collects (at 440) for each flow. The forwarding element sends (at 445) the flow statistics to the aggregator 415. The aggregator receives (at 450) the flow statistics from the forwarding element (and other forwarding elements, if any). The aggregator uses (at 455) the tags that are included in the flow counters to identify the interfaces associated with the flows. The aggregator determines (at 460) whether there as been discontinuity in the statistics for each interface. The aggregator then updates (at 465) the statistics for each interface.

Figure 5:
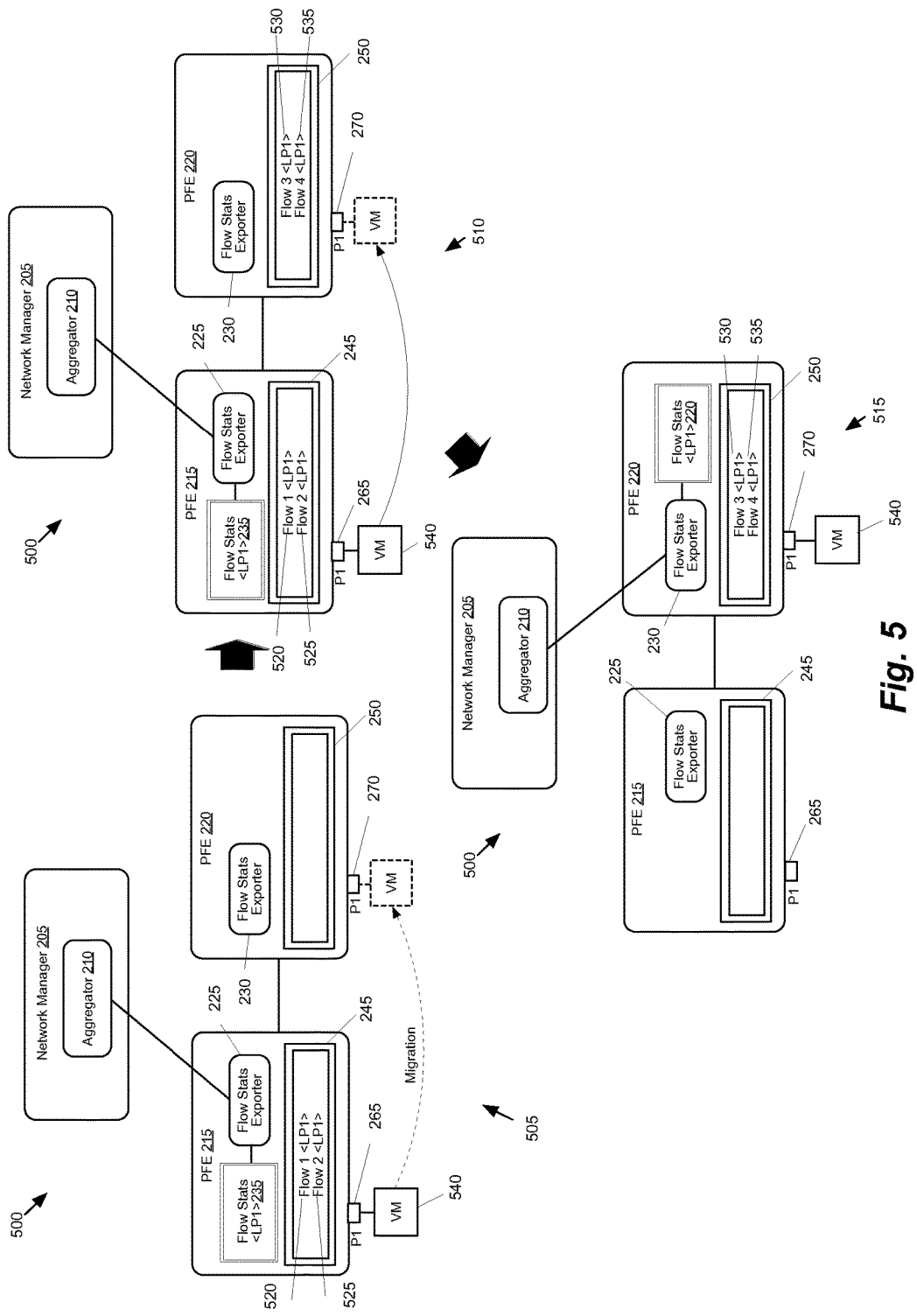
FIG. 5 provides an illustrative example of how a logical port of a logical forwarding element can be defined by two separate physical ports of two separate physical forwarding elements.

A reason why the system uses flows is that there may be no one-to-one correlation between a physical port and a logical port. In some cases, one logical port can be defined by two or more physical ports. FIG. 5 provides an illustrative example of how a logical port of a LFE can be defined by two separate physical ports of two separate PFEs. Three stages 505-515 of the system 500 are shown in this figure. The figure includes the network manager 205 and the PFEs 215 and 220 described above by reference to FIG. 2.

The first stage 505 conceptually shows that a migration operation has been initiated. The operation moves a virtual machine (VM) from one computing device (host device) to another computing device. In some embodiments, the network manager includes a component (e.g., a migration tool) to perform live migration of VMs. In some embodiments, live migration entails moving an entire running VM (e.g., the VM 540) from one physical server to another, without downtime. The VM retains its network identity and connections, ensuring a seamless migration process. The migration may also entail transferring the VM's active memory and precise execution state (e.g., over a high-speed network), allowing the VM to switch from running on a source hypervisor host to a destination hypervisor host.

In the example of FIG. 5, the migration operation entails connecting the VM 540 from physical port one 265 of the PFE 215 to physical port one 270 of the PFE 220. This is conceptually shown with the dashed line that indicates the VM 540 (and the corresponding VNIC, e.g., VNIC 125 in FIG. 1) being connected to port one 270 of the PFE 220 from port one 265 of the PFE 215. The first stage 505 also shows that prior to the initiation of the migration operation the PFE 215 maintained two flows 520 and 525 that are tagged to track logical port statistics. Also, prior to the initiation, the PFE 220 maintains no tagged flows to track the statistics of the same logical port.

The second stage 510 shows the system 500 during migration of the VM 540 from one computing device to another. As shown, during migration, the VM 540 may be at some point in time connected to both port one 265 of the PFE 215 and port one 270 of the PFE 220. This is primarily done to prevent data loss. To support the new connection, the datapath cache 250 of the PFE 220 is populated with several flows 530 and 535 that correspond to the flows 520 and 525 in the datapath cache 245 of the PFE 215.

Hence, the second stage 510 shows that one logical port can sometimes be defined by two separate physical ports 265 and 270 of two separate PFEs 215 and 220. In addition, the second stage 510 shows that statistics relating to one logical port can come from two flow stats exporters 225 and 230 on the two separate PFEs 215 and 220.

The third stage 515 shows the system 500 after migrating the machine 540 from one computing device to another. As the VM 540 is no longer connected to the port one 265 of the PFE 215, the flows 520 and 525 in the datapath cache 245 have timed out. The flows 530 and 535 in the datapath cache 250 of the PFE 220 remain in the cache to process packets for the VM 540. The flow stats exporter 230 remains active on the PFE 220 to export statistics relating to the logical port. On the other hand, the flow stats exporter 225 on the PFE 215 does not export any statistics relating to the logical port. This is because the VM 540 is no longer connected to the PFE 215.

Figure 6:
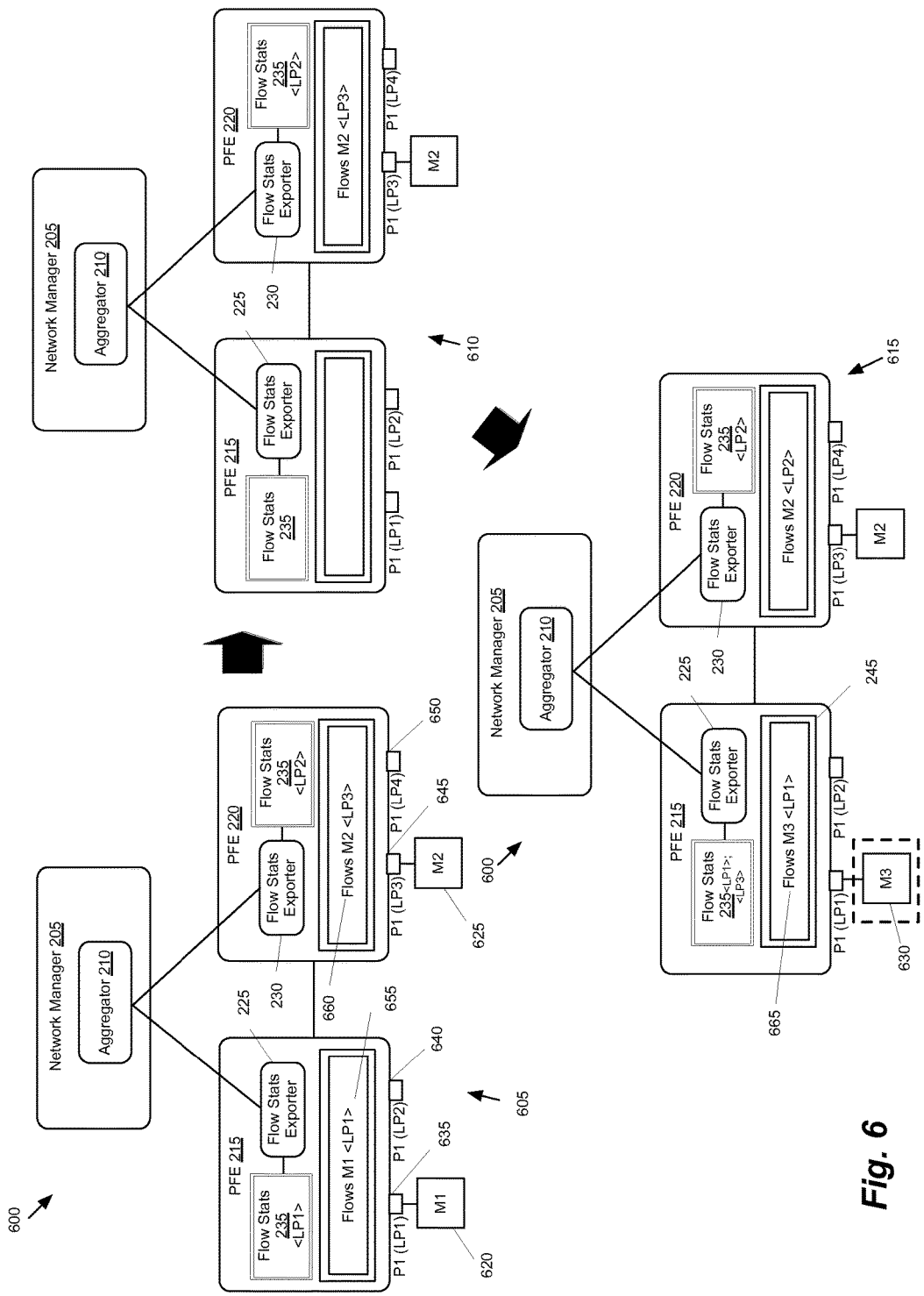
FIG. 6 provides an illustrative example of how several machines can be connected to different router ports at different at different times.

In some case, there may be no one-to-one correlation between a port (e.g., physical or logical) and a machine (and the corresponding interface). FIG. 6 provides an illustrative example of how several machines can be connected to different router ports at different times. Three stages 605-615 of the system 600 are shown in this figure. The figure includes the network manager 205 and the PFEs 215 and 220 described above by reference to FIG. 2. In this example, the physical ports one and two 635 and 640 of the PFE 215 correspond to logical ports one and two of the LFE (not shown). The physical ports one and two 645 and 650 of the PFE 220 correspond to logical ports three and four of the same LFE.

In the first stage 605, the machine 620 (and its associated interface, e.g., a VNIC) is connected to the logical port one via the physical port one 635 of the PFE 215. The machine 625 is connected to the logical port three via the physical port one 645 of the PFE 220. The first stage 605 also shows several flows 655 and 660 that are tagged to track statistics of the logical ports one and three of the LFE.

The second stage 610 shows that the PFE 215 is no longer processing packets that are associated with the machine 620. Here, the machine 620 is not even connected to any physical or logical port. This can occur if the machine 620 is moved or silent for a set period of time. For instance, if the machine is idle for the set period of time, the LFE might remove the machine's address. The LFE might add the address again if it detects that machine 620 is connected to one of its logical ports.

The third stage 615 shows a different machine 630 (and its associated interface, e.g., a VNIC) being connected to the port one of the PFE (and the LFE). To continue tracking stats of the logical port one, the datapath cache 245 of the PFE 215 shows that each flow associated with the machine 630 has been tagged with a logical port identifier.

In conjunction with logical port statistics or instead of them, the system of some embodiments provides tools to retrieve statistics relating different aggregated entities. In some embodiments, each aggregated entity may be defined by associating multiple related flows with the same aggregation identifier or key. An example of an aggregated entity is described below by reference to FIG. 7.

Figure 7:
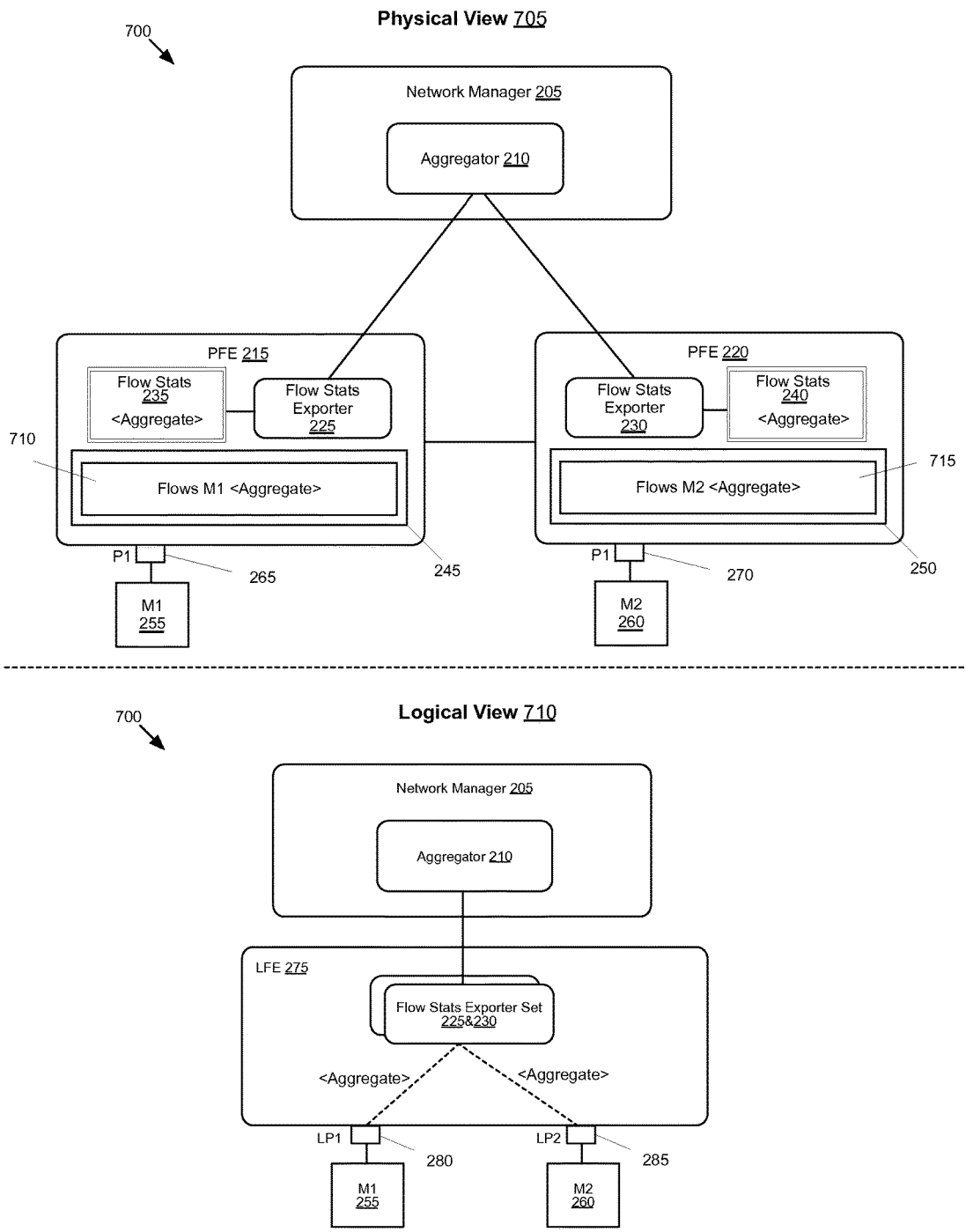
FIG. 7 illustrates a system for aggregating statistics relating to a pair of ports.

FIG. 7 illustrates a system 700 that aggregates statistics relating to an aggregated entity (e.g., an interface such as a port, a pair of ports, a VNIC, an uplink, or a logical router). In this figure, the aggregated entity is a pair of logical ports. This figure is similar to FIG. 2. However, the physical view 705 of FIG. 7 shows that the flows 710 and 715 of the machines 255 and 260 are tagged with the same aggregation identifier. The flow stats exporters (225 and 230) send the flow statistics to the aggregator 210. The aggregator 210 performs the aggregation of the statistics to figure out the total statistics associated with the flows 710 and 715.

The logical view 710 of FIG. 7 is also similar to the one shown in FIG. 2. Different from FIG. 2, the flow statistics relate to the logical port pair, which consists of logical ports one and two 280 and 285 of the LFE 275. The dashed arrow and the tag, shown between the flow stats exporter set 225 and 230 and each logical port (280 or 285) indicate that statistics of the port pair are collected indirectly through the flow statistics (235 and 240).

I. Example System Architecture

Figure 8:
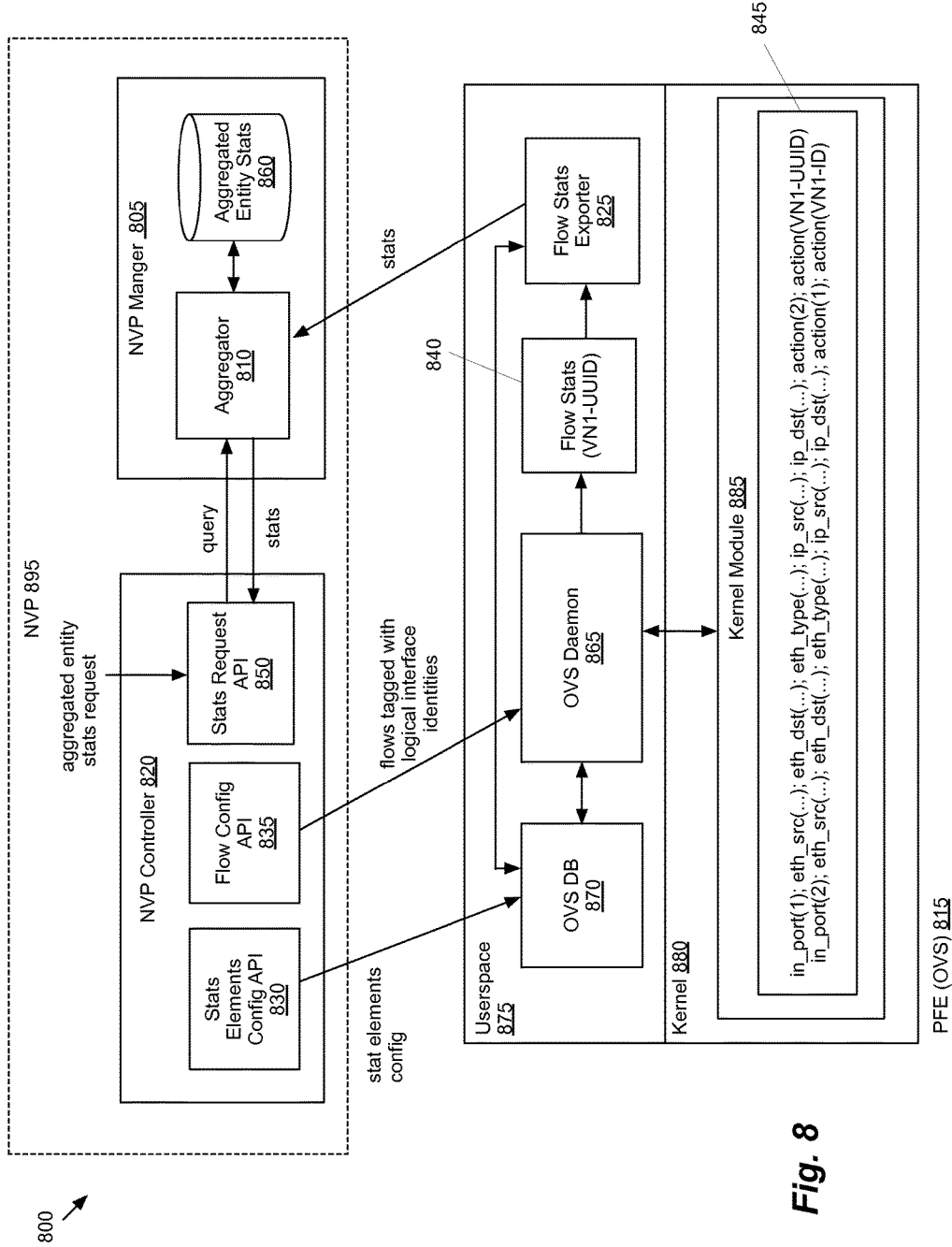
FIG. 8 conceptually illustrates a system with a scalable framework to collect statistics.

In some embodiments, the system provides a scalable framework to collect statistics. FIG. 8 illustrates an example system 800 with such a scalable framework. As shown, the system includes a network virtualization platform (NVP) 895 and a physical forwarding element (PFE) 815. The main components of the framework is the flow stats explorer 825 that operates on the PFE 815 and the aggregator 810 that operates on the NVP 895.

In the example of FIG. 8, the PFE 815 is a software forwarding element, such as an Open Virtual Switch (OVS). In some embodiments, the software forwarding element is implemented on virtualization software or an operating system that has a kernel 880 and a userspace 875. For instance, the software forwarding element may run on a unique virtual machine that has a modified Linux kernel. In some embodiments, the kernel 880 is the most basic component of an operating system that runs on a separate memory space and is responsible for managing system resources (e.g., communication between hardware and software resources). In contrast, the userspace is a memory space where different user applications can run.

As shown, the userspace 875 of the PFE 815 includes an OVS daemon 865, an OVS database 870, and a flow stats exporter 825. Other daemon processes or applications (not shown) may be included in the userspace 875 as well. The OVS daemon 865 is an application that runs in the background of the userspace 875.

The OVS daemon 865 of some embodiments receives management and configuration information from the NVP controller 820. The OVS daemon 865 may also receive management information from the OVS database (DB) 870. In some embodiments, the management information includes logical forwarding element (LFE) information, bridge information, virtual interface information, tunnel information, etc. To receive management information, the OVS daemon of some embodiments communicates with the NVP controller and the OVS DB using a particular protocol (e.g., OVS DB protocol).

In some embodiments, the configuration information includes flows or instructions that are translated into flows. The OVS daemon 865 of some embodiments receives the flows from the NVP controller through a particular channel (e.g. OpenFlow channel) using a particular protocol (e.g., OpenFlow protocol). In some embodiments, the OVS daemon receives flows that are tagged in some manner to facilitate stats collection. The OVS daemon may also store the flows in a set of one or more flow tables (not shown).

The flow stats exporter 825 of some embodiments reads flow statistics from a storage (e.g., memory 840) and exports flow statistics to an aggregator 810. In some embodiments, the flow stats exporter 825 is also a daemon process that runs in the userspace 875 of the PFE 815. In some embodiments, the flow stats exporter 825 retrieves the statistics from memory using OpenFlow protocol. The flow stats exporter 825 may communicate with the OVS daemon 865 using the OpenFlow protocol to retrieve the statistics.

In some embodiments, the flow stats exporter 825 only export flow statistics that are associated with a tag. The flow stats exporter can export all the different flow statistics that are associated with different tags. In some embodiments, the flow stats exporter can be configured to look for certain tags and output only those stats that are associated with the tags. In some embodiments, the flow stats exporter can be configured to export the stats in set time interval. In some embodiments, the time interval is associated with one tag. This means the flow stats exporter will only export each flow stat associated with that one tag each time the time interval expires. Alternatively, the flow stats exporter can dump all the different flow statistics that are associated with different tags each time the time interval expires. In some embodiments, the flow stats exporter exports the stats in a particular format.

The flow stats exporter 825 of some embodiments receives its configuration information from the OVS DB 870. This is shown in FIG. 8 with the arrow between the flow stats exporter 825 and the OVS DB 870. The flow stats exporter 825 may use a particular protocol (e.g., the OVS DB protocol) to receive the configuration information. In some embodiments, the flow stats exporter reads the configuration information from the OVS DB in set time interval. Alternatively, the flow stats exporter may be registered with the OVS DB server to receive an update each time there is a change to the configuration information in the OVS DB.

As shown in FIG. 8, the kernel 880 includes a kernel module 885 and a datapath cache 845. The kernel module 885 operates on the kernel 880 to process incoming packet. When a packet is received, the kernel module of some embodiments performs a packet classification operation to identify a matching flow in the datapath cache. If there is a matching flow, the kernel module of some embodiments performs the matching flow's associated action on the packet. However, if there is no matching flow, the packet processing is shifted from the kernel 880 to the userspace 875.

When there is a miss in the datapath cache 845, the OVS daemon 865 of some embodiments receives the packet and consults one or more flow tables (not shown) to generate a flow to install in the datapath cache. In some embodiments, the generated flow is based on one or more flows from the NVP controller 820. The generated flow can have the same match field values and a set of one or more actions as a corresponding flow in a flow table. The generated flow can have the same set of actions as that corresponding flow, such as a note action with a tag that identifies an aggregate entity. However, different from the flow from the flow table, the generated flow may not have a priority value and/or may include one or more fields that are wildcarded, or at least partially wildcarded, in some embodiments.

Upon generating the flow, the OVS daemon 865 then sends the packet back to the kernel module 885 with instructions on how to process (e.g., forward or drop) the packet. The OVS daemon also sends to the kernel module the generated flow. The generated flow is then stored in the datapath cache 845 to quickly process other packets having the same set of header values. Accordingly, the datapath cache 845 provides a fast path to process incoming packets. This is because it does not involve flow generation or translation that can occur in the userspace. However, the switching decisions are ultimately made at the userspace 875 with the OVS daemon 865 generating flows to push into the datapath cache 845.

The NVP 895 of some embodiments is used to manage and configure PFEs. These PFEs can be software or hardware forwarding elements, in some embodiments. For instance, the NVP of some embodiments communicates with both software and hardware forwarding elements to define logical forwarding elements. In the example of FIG. 8, the NVP 895 includes a NVP controller 820 and a NVP manager 805.

In some embodiments, the NVP controller 820 is programmed to manage and configure the PFEs (e.g., the PFE 815). The NVP controller may perform the management by sending (e.g., pushing) to the PFEs bridge information, LFE information, virtual interface information, tunnel information, etc. The NVP controller of some embodiments performs the configuration by sending (e.g., pushing) flows to the PFEs. Instead of sending flows, the NVP controller 205 of some embodiments pushes forwarding state information that is translated into a set of flows at the PFE. For instance, instead of pushing flows, the NVP controller may exchange forwarding state with a hardware forwarding element.

As shown, the NVP controller 820 includes (1) a stats elements configuration application programming interface (API) 830, (2) a flow configuration API 835, and (3) a stats request API 850. The stats element configuration API 830 is used to configure the flow stats exporter 825. In some embodiments, the stats element configuration API 830 may also be used to configure the aggregator 810. In some embodiments, the stats element configuration API 830 stores configuration information in the OVS DB 870. As mentioned above, the flow stats exporter 825 of some embodiments reads the configuration information from the OVS DB 870 to configure itself. In some embodiments, the NVP controller 820 uses a particular protocol (e.g., OVS DB protocol) to communicate with the OVS DB 870.

The flow configuration API 835 is used to push flows to the OVS daemon 865. The NVP controller 820 of some embodiments pushes flows to the OVS daemon 865 through a particular channel (e.g. OpenFlow channel) using a particular protocol (e.g., OpenFlow protocol). In some embodiments, the OVS daemon receives flows that are tagged in some manner to facilitate stats collection. The OVS daemon may also store the flows in a set of one or more flow tables (not shown). In some embodiments, an entity (e.g., the API 835) in the NVP controller 820 is used to tag a flow with an entity (such as an uplink, a VNIC, a logical router, a logical port identifier or an identifier of a logical port pair).

The stats request API 850 provides an interface to retrieve statistics from the storage 860. In some embodiments, the stats are retrieved from the storage 860 through the aggregator 810. For instance, in the example of FIG. 8, a network administrator's aggregated entity stats request is initially received at the stats request API. The stats request API then make a query to the aggregator based on the stats request. The aggregator retrieves the requested stats from the storage 860. The aggregator then returns the stats to the stats request API. The stats request API then provides the retrieved stats to the network administrator. In some embodiments, the user interface with the statistical data is provided by the NVP manager 805.

Different from the NVP controller 820, the NVP manager 805 of some embodiments provides a user interface to access various services that the NVP controller provides. The NVP manager can also include logic that is not included in the NVP controller. In the example of FIG. 8, the NVP manager of some embodiments includes the stats aggregation logic with the aggregator 810.

The aggregator 810 of some embodiments is a component of the system 800 that (1) receives statistics from one or more flow stats exporters, and (2) stores the statistics in the storage 860. The storage is a database, in some embodiments. Rather than simply storing the statistics, the aggregator accumulates or aggregates the statistic. This means that that for a given entity or a given aggregated entity, the aggregator initially stores the statistics and then updates the statistics with each stats report from a flow stats exporter. As an example, when the initial report has a value x for the packet count and a subsequent report has a value y, the aggregator may update the initial statistics by adding the delta or difference between those two values.

In some embodiments, the aggregator 810 is also used to retrieve statistics from the storage 860. For instance, when there is a request for statistic relating to a logical port or an aggregated entity, the aggregator in some such embodiments queries to the storage to retrieve the requested statistics. Alternatively, the system of some embodiments separates the statistics aggregation from the statistics retrieval. In other words, the system can include separate components that perform the aggregation and the retrieval.

One of ordinary skill in the art would understand that the system architecture is an example architecture and that different embodiments can include different sets of components. The naming of the various components is arbitrary and can change from one implementation to another. While many of the features of the system 800 have been described as being performed by one component or module (e.g., the aggregator, the flow stats exporter), one of ordinary skill in the art will recognize that the functions of such components and other components described herein might be split up into multiple sub-components. Similarly, functions described as being performed by multiple different components might be performed by a single component, in some embodiments.

II. Example Operations

The preceding section descried a system that includes a scalable framework to collect statistics. Several example operations of the system will now be described below by reference to FIG. 9-15.

A. Configuration

Figure 9:
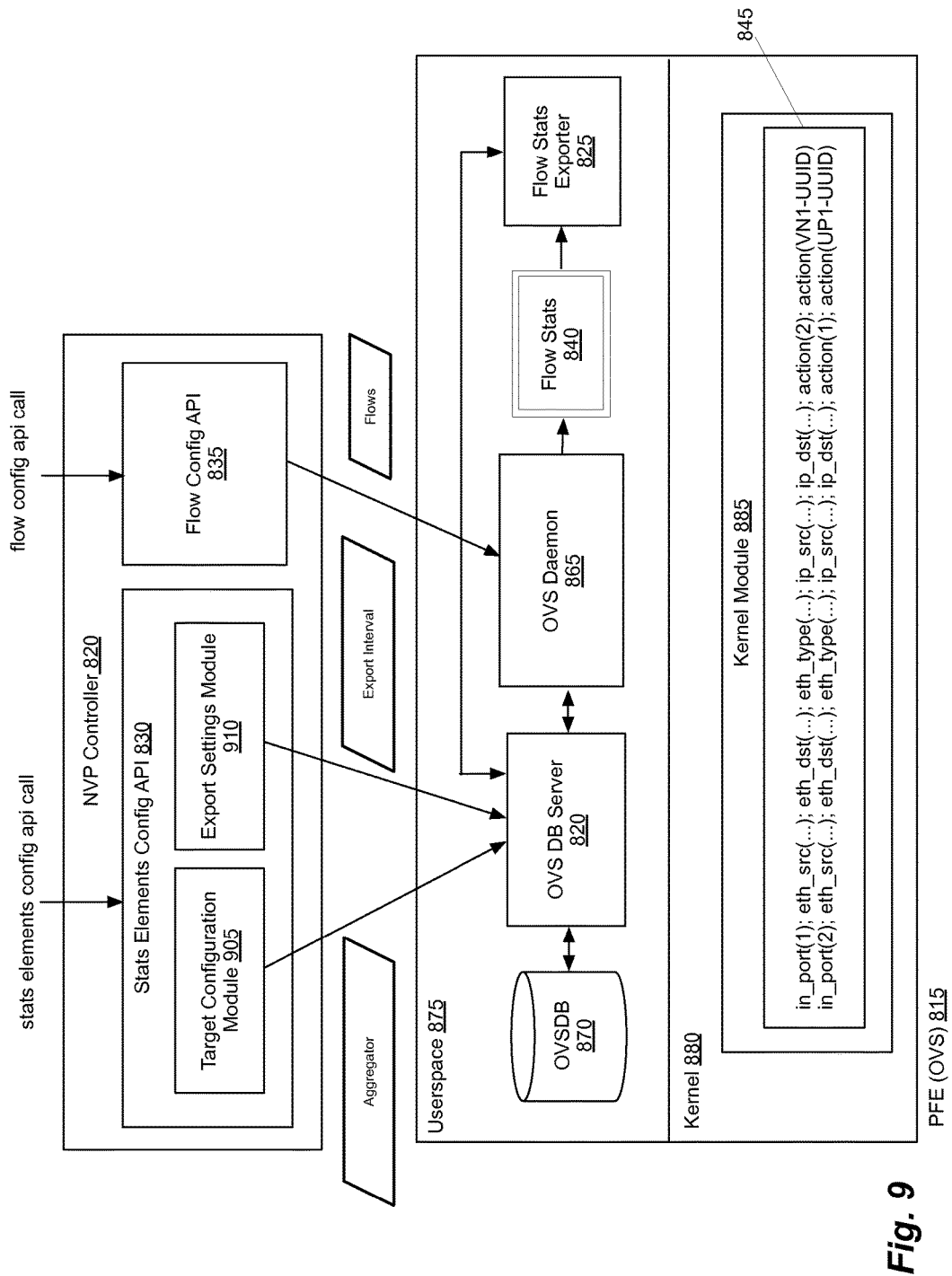
FIG. 9 shows a data flow diagram that illustrates an example of configuring a transport node to export stats to an aggregator.

FIG. 9 shows a data flow diagram that illustrates an example of configuring a transport node to export stats to an aggregator. The figure includes the NVP controller 820 and the PFE 815 that are described above by reference to FIG. 8. In the example of FIG. 9, the transport node is the PFE 815.

As shown in FIG. 9, the NVP controller 820 of some embodiments sends various pieces of configuration data to the PFE 815. The data flow for configuring the flow stats exporter 825 begins when a network administer uses the stats element configuration API 830 to input configuration data. The configuration data is then sent by the stats element configuration API 830 to the OVS DB server 870. In some embodiments, the configuration data includes aggregator data. The aggregator data specifies that the flow stats exporter 825 report to a particular aggregator. The aggregator data may include an address (IP address) and/or a name or identifier associated with the particular aggregator. In some embodiments, the configuration data includes export interval. In some embodiments, the configuration data includes one or more tags. In the example of FIG. 9, the stats element configuration API 830 includes a target configuration module 905 to send the aggregator data and an export settings module 910 to send the export interval.

The data flow for pushing flows to the PFE 815 begins when a network administrator uses the flow configuration API 835 to input flows. For the purpose of stats collection, the user may input instructions to tag certain flows. The flow config API then sends each flow to the PFE. The OVS daemon 865 of the PFE 815 receives each flow and stores the flow in a flow table (not shown). If the kernel module 880 cannot process a packet, the flow or a modified version of the flow may be installed in the datapath cache 845.

Figure 10:
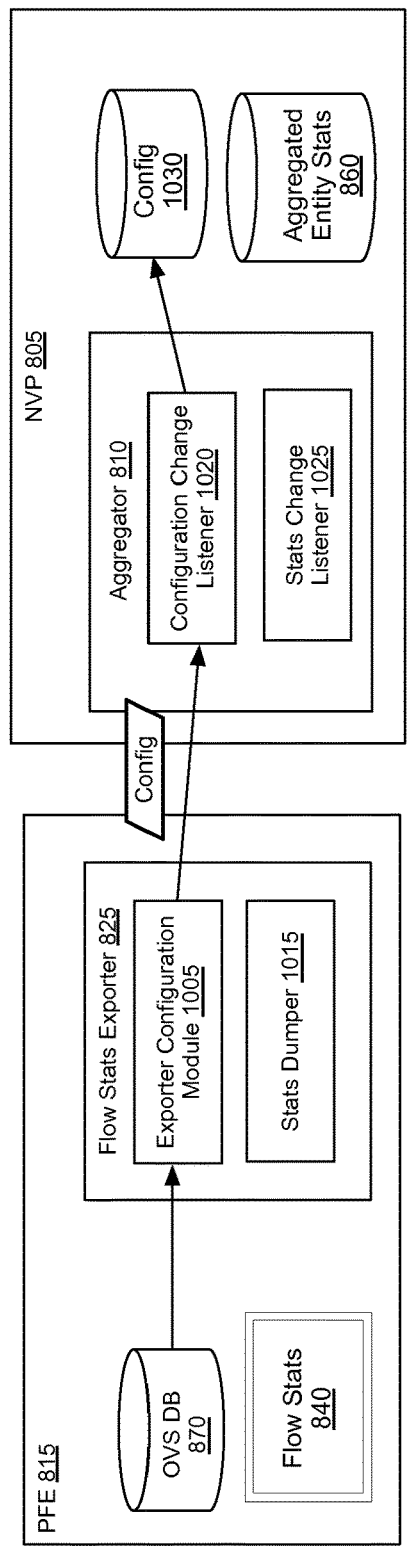
FIG. 10 provides an illustrative example of the flow stats exporter receiving configuration data from the storage and then sending it to the aggregator.

In some embodiments, the flow stats exporter receives configuration from the storage and propagates the configuration to an aggregator. FIG. 10 provides an illustrative example of the flow stats exporter receiving configuration data from the storage and then sending it to the aggregator.

As shown in FIG. 10, the flow stats exporter 825 of some embodiments includes an exporter configuration module 1005 to read configuration data from the storage 870 (e.g., in a periodic basis) and to configure the exporter. The configuration module 1005 may also send one or more pieces of configuration data to the aggregator 810. The flow stats exporter 825 also includes a stats dumper 1015 that reads flow stats from memory (e.g., in a periodic basis) and send the flow stats to the aggregator 810. In some embodiments, flow stats exporter has two communication channels to each aggregator, one for configuration and another for stats. However, these channels might be multiplexed onto the same port by just encoding the messages. Also, it is not entirely necessary for them to be on two separate ports. In some embodiments, if more than one aggregator is configured, the flow stats exporter will bucket the aggregators and hash one or more values (e.g., the annotated aggregation key) to determine which aggregator to send the statistics to. The hash will be consistent across each of the flow stats exporter, in some embodiments.

In some embodiments, the configuration data may include a table to configure "logical sFlow agents". This configuration may include (but is not limited to): rate of export, sFlow collector endpoints (IP, port). Normally, physical forwarding elements run their own sFlow agents and are configured via the command line with the rate of export and sFlow collector endpoints. The idea is that the aggregators may simulate a virtual sFlow agent per logical forwarding element, and export sFlow formatted sampling data to the configured sFlow collector endpoints. By doing so, an administrator can leverage a normal sFlow collector to collect statistics from a logical forwarding element, which does not exist in reality. To implement this correctly, the note action of some embodiments used to tag the flow must also include the logical forwarding element identifier and the port index (port number) of the logical port. Note that the port index is necessary because the sFlow format does not support UUIDs to identify the ports on a switch. The reason is because physical switches normally have a fixed number of ports (<255 generally), so the ports are identified via an index.

In some embodiments, the stats that the aggregator export via sFlow will be ifIn/OutOctets and In/OutunicastPkts. The unicastPkts includes the total multicast, broadcast, and unicast packet counts. For the source sFlow agent ipv6 address, the framework of some embodiments uses the logical switch's UUID. For the interface ID, the framework of some embodiments uses the logical port ID. In some embodiment, the stats updates and stats exports occur asynchronously. So, regardless of how fast the aggregator receive updates, the aggregator of some embodiments only pushes updates according to its own internal timer per configured logical switch.

B. Updating Statistics

Figure 11:
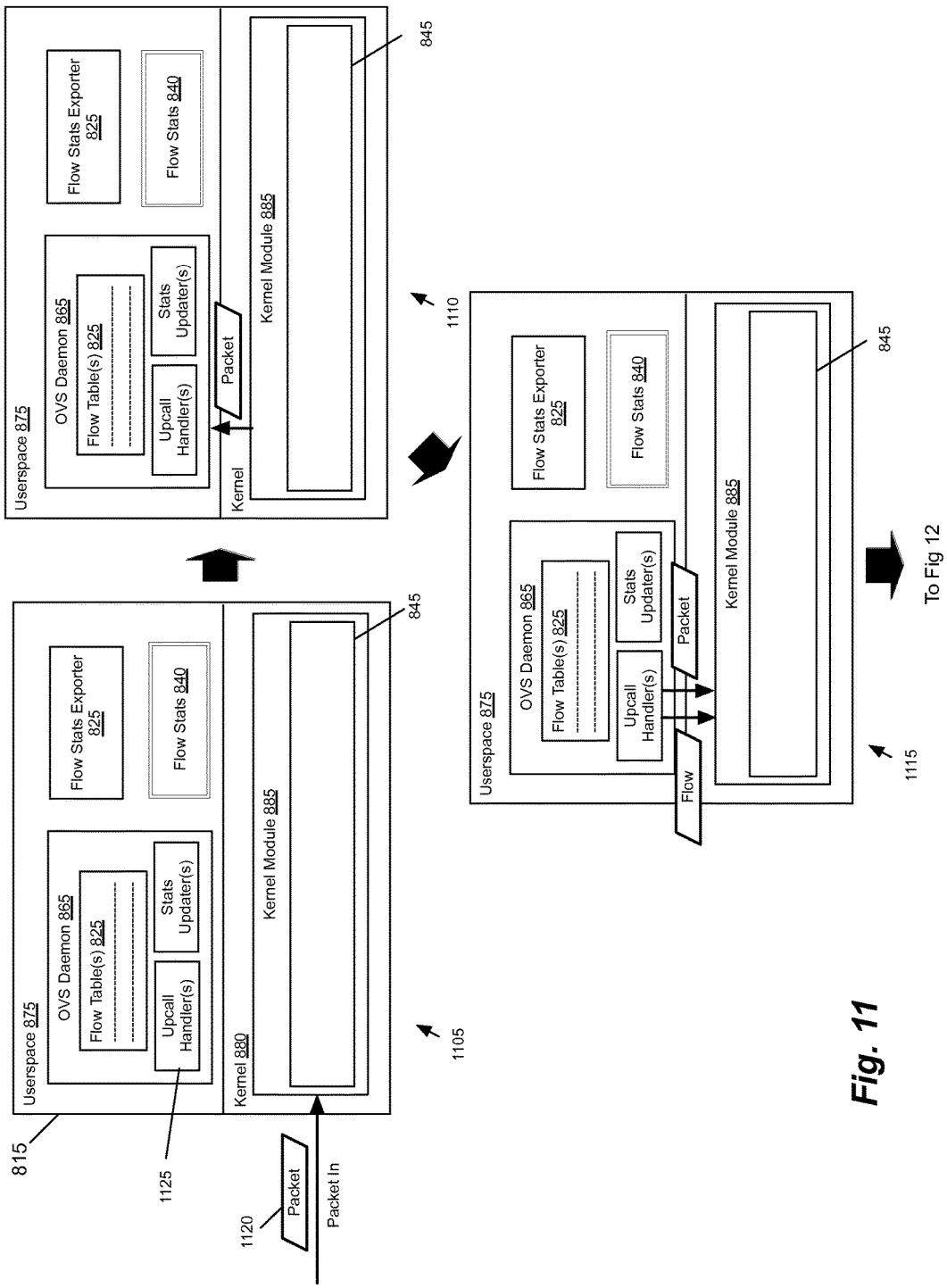
FIG. 11 illustrates an example of a physical forwarding element installing a flow in a cache to forward packets.
Figure 12:
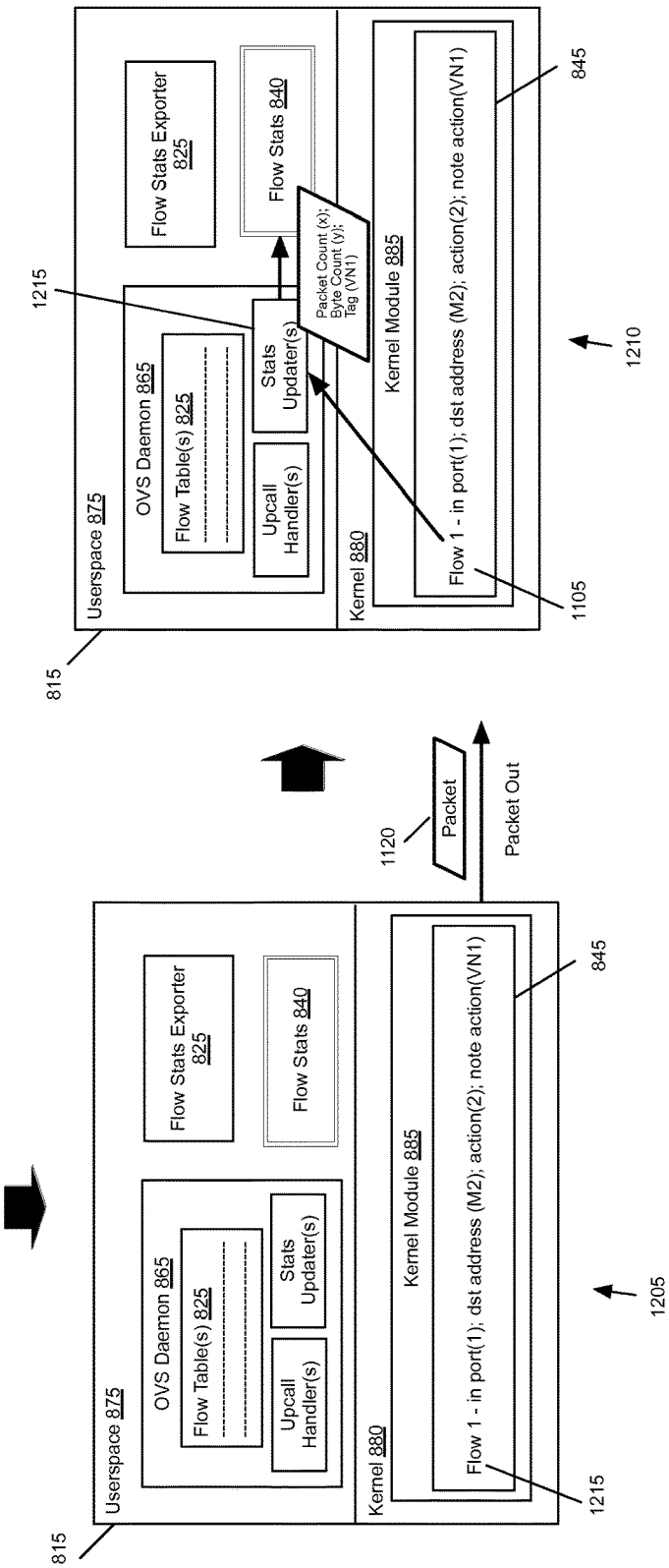
FIG. 12 illustrates an example of the physical forwarding element forwarding a packet and updating statistics associated with the flow.

Several examples of updating statistics will now be described by reference to FIGS. 11 and 12. FIGS. 11 and 12 illustrate an example of how the physical forwarding element (PFE) of some embodiment process a packet using a flow annotated with a marking and update the statistics associated with the flow. Specifically, FIG. 11 illustrates an example of a PFE installing a flow in a cache to forward packets. This is followed by FIG. 12, which illustrates an example of the PFE forwarding a packet and updating statistics associated with the flow. These figures illustrate the PFE 815 that is described above by reference to FIG. 8.

Three operational stages 1105-1115 of the PFE 815 are shown in FIG. 11. The first stage 1105 shows the PFE 815 receiving a packet 1120. The packet is received by the kernel module 885 of the PFE 815. After receiving the packet, the kernel module 885 of some embodiments performs a packet classification to identify a matching flow from the datapath cache 845. As no matching flow is found in the datapath cache 845, the control is shifted from the kernel space 880 to the userspace 875. This is shown in the second stage 1110 with the packet being sent from the kernel module 880 to the OVS daemon 865.

In the second stage 1110, the OVS daemon 865 calls upon an upcall handler 1125 to generate a flow to install in the datapath cache 845. In some embodiments, the upcall handler operates in a separate thread to generate the flow. There can also be a number of upcall handlers that operates in separate threads to generate flows. In some embodiments, the upcall handler performs a packet classification to identify a matching flow from one or more flow tables 925. In some embodiments, the generated flow is based on the matching flow identified by the upcall handler.

The third stage 1115 illustrates the PFE 815 after the upcall handler 1125 has generated a flow to install in the datapath cache 845. Here, the upcall handler sends the packet back to the kernel module 885 with instructions on how to process (e.g., forward or drop) the packet. The upcall handler also sends to the kernel module the generated flow. The generated flow is then stored in the datapath cache to quickly process other packets having the same set of header values.

Two operational stages 1205 and 1210 of the PFE 815 are shown in FIG. 12. These stages 1205 and 1210 are a continuation of the ones shown in the previous figure. The first stage 1205 shows that the generated flow 1215 has been installed in the datapath cache 845. The flow includes a set of match fields, an action to perform on the packet, and a note action. The note action is used to facilitate stats collection. In the first stage 1205, the kernel module 885 also forwards the packet 1120 by sending it out a particular output port (e.g. port two).

The second stage 1210 shows the PFE 815 updating statistics associated with the flow 1105. In the second stage 1210, the OVS daemon 865 calls upon a stats updater 1215 to update the statistics associated with the flow. In some embodiments, the stats updater operates in a separate thread to update statistics associated with the flow. The stats updater of some embodiments reads various counters (e.g., in memory of the kernel space 880) to store the stats (e.g., in memory 845 of the userspace 875).

In some embodiments, the PFE 815 includes a revalidator that revalidates each flow in the datapath cache while updating the flow's stats. The revalidation is important because, in some case, the PFE is constantly receiving new flows and deleting exiting flows in the flow table(s) 925. In some embodiments, the revalidation entails performing a classification operation the flow's match field values using the flow table(s) 925 and determining if the set of one or more actions remain the same. If the set of actions are different, the flow is removed from the datapath cache 845.

In some embodiments, the PFE 815 includes a flow dumper that performs a flow eviction process while updating the flow's stats. The flow eviction process of some embodiments determines if a flow in the datapath has expired and, if so, removes the flow from the datapath cache 845. For instance, if the flow has been in the cache for a set period of time or has not been used for a set period of time, the PFE 815 may delete the flow from the datapath cache 845. In some embodiments, the PFE 815 makes the decision about how long a flow stays in the datapath cache 845 based on how recently it was used and/or the amount of flows in the cache.

D. Exporting Statistics

Figure 13:
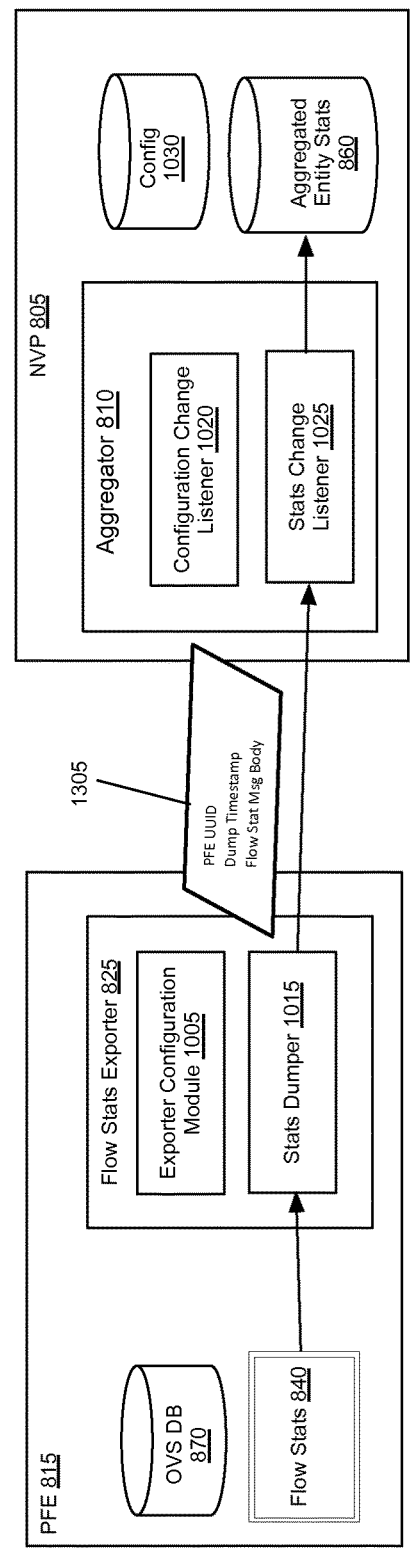
FIG. 13 illustrates an example of the flow stats exporter sending a report with the flow stats.

As mentioned above, the flow stats exporter of some embodiments exports flow stats to the aggregator in a periodic basis. FIG. 13 illustrates an example of the flow stats exporter sending a report with the flow stats. As shown in FIG. 13, the flow stats exporter 825 of some embodiments includes the stats dumper 1015 that reads flow stats from memory 840 and sends a report with the flow stats to the aggregator 810. In some embodiments, the flow stats exporter dumps flow statistics in set timed interval. For instance, the flow stats exporter may read and send flow statistic to the aggregator each second, some millisecond, or some other set time period. In some embodiments, the flow stats exporter can be configured to export at a specified time interval. Alternatively, the flow stats exporter of some embodiments is hard-coded with a time interval (e.g., a default time interval).

As shown in FIG. 13, the aggregator 810 of some embodiments includes a stats change listener 1025 to listens for each stats report. After receiving the report, the aggregator of some embodiments may store the stats in the report or use the stats in the report to update previously stored stats. For instance, when the initial report has a value x for the byte count and a subsequent report has a value y, the aggregator may update the initial statistics by adding the delta or difference (y-x) between those two values.

In some embodiments, the report 1305 can include one or more stats for one aggregated entity. Alternatively, the report can include multiple stats for different aggregated entity. In some embodiments, the report includes a timestamp that represents dump time. In some embodiments, the dump time is used to calculate a start time for a flow. The start time can be calculated by subtracting the duration of the flow from the dump time. The start time is used to detect discontinuity in the current stats report. In some embodiments, the report can include one or more of the following: a UUID of the PFE, a dump timestamp, a hash (e.g., a hash of flow match, aggregation key, and/or counter type), a flow identifier (ID), an aggregation key (e.g., logical port UUID, port-pair UUID), hypervisor to hypervisor tunnel UUID, duration, number of bytes sent, number of packets sent, and counter type.

E. Example Operations of the Flow Stats Exporter

Figure 14:
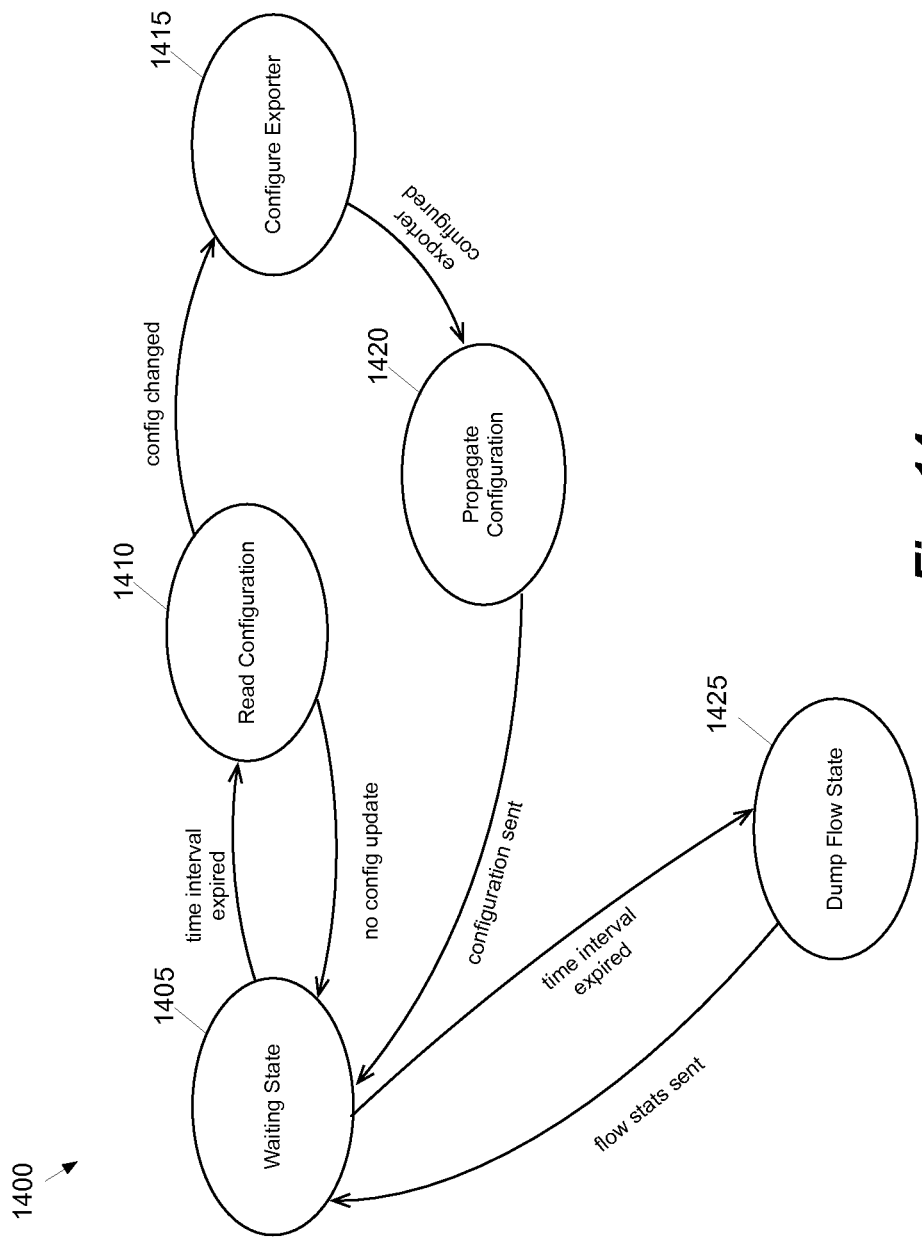
FIG. 14 presents a state diagram that illustrates example operations performed by a flow stats exporter.

In some embodiments, a flow stats exporter is implemented on each physical forwarding element (PFE) that participates in the accumulation of the statistics. FIG. 14 presents a state diagram 1400 that illustrates example operations performed by such a flow stats exporter. This figure shows several states 1405-1425 that collectively perform these operations. Each of the states represents a set of one or more processes for performing a subset of the operations. The states include a waiting state 1405, a read configuration state 1410, a configure exporter state 1415, a propagate configuration state 1420, and a dump flow state 1425. Not all operations have to be performed by the flow stats exporter. For instance, the flow stats exporter of some embodiments does not propagate the configuration to an aggregator.

In the waiting state 1405, the flow stats exporter of some embodiments waits for a specified time interval to expire in order to read configuration from a storage (e.g., database). When the time interval has expired, the flow stats exporter transitions to the read configuration state 1410. In the read configuration state, the flow stats exporter reads configuration from the storage. If there is no configuration update, the flow stats exporter returns to the waiting state 1405.

If the configuration has changed, the flow stats exporter enters the configure exporter state 1415. In this state, the flow stats exporter configures itself according to the configuration data from the storage. In some embodiments, the configuration can include one or more of the following: configuring a time interval to dump flow stats, configuring the flow stats exporter to send flow stats to a particular aggregator, configuring the flow stats exporter to export flow stats of each flow that is associated with a particular tag, and configuring the flow stats exporter to stop exporting the flow stats of each flow that is associated with the particular tag. In some embodiments, the flow stats exporter can be configured to reset statistics (e.g., by replacing the aggregated statistics value with a zero value).

In some embodiments, if the configuration has changed, the flow stats exporter also enters the propagate configuration state 1420. In this state, the flow stats exporter sends one or more pieces of the configuration data to the aggregator. An example of propagating configuration is described above by reference to FIG. 10.

Once the configuration has been propagated, the flow stats exporter returns to the waiting state 1405. As mentioned above, the flow stats exporter of some embodiments does not wait for a set time interval to read configuration data from the storage. The flow stats exporter may be registered with a database server to receive an update each time there is a change to the configuration information in the database.

In the waiting state 1405, the flow stats exporter of some embodiments waits for a specified time interval to expire in order to read flow stats from a storage (e.g., memory). When the time interval has expired, the flow stats exporter transitions to the dump flow state 1425. In this state, the flow stats exporter reads flow stats from storage, generates a report, and sends the report to the aggregator. The message may include the current stats associated with each flow that is tagged with a particular tag. The message may also include a dump time that is used to calculate a start time of each flow. Several example of dumping flow stats have been described above by reference to FIG. 13.

F. Example Operations of the Aggregator

As mentioned above, the system of some embodiments includes an aggregator. The aggregator of some embodiments is a component of the system that receives statistics from one or more flow stats exporters, and stores the statistics in a storage. Rather than simply storing the statistics, the aggregator accumulates or aggregates the statistic. This means that for a given entity or a given aggregated entity, the aggregator initially stores the statistics and then updates the statistics with each stats report from a flow stats exporter.

Figure 15:
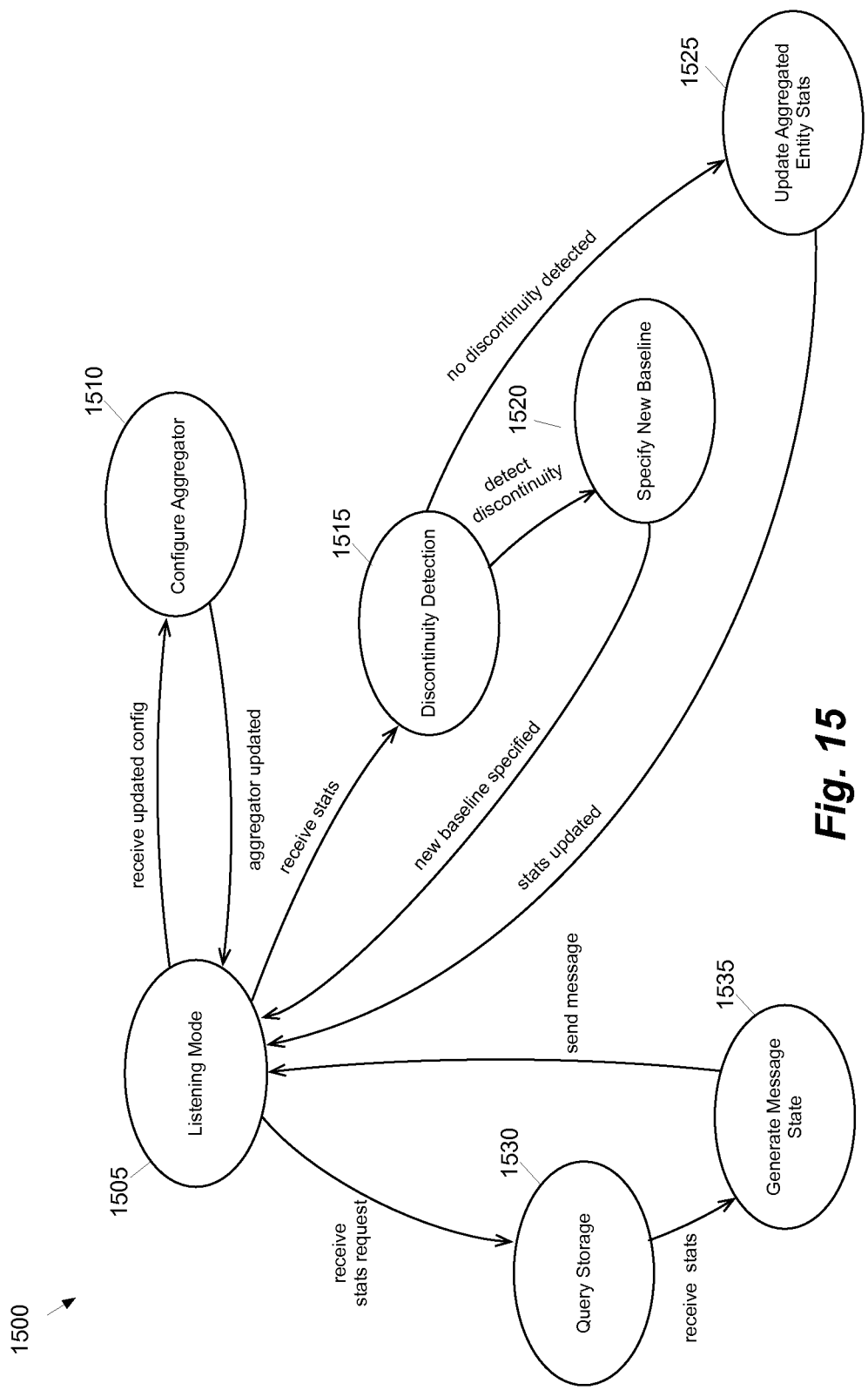
FIG. 15 presents a state diagram that illustrates example operations performed by an aggregator.

FIG. 15 presents a state diagram 1500 that illustrates example operations performed by the aggregator. This figure shows several states 1505-1530 that collectively perform these operations. Each of the states represents a set of one or more processes for performing a subset of the operations. The states include a listening mode state 1505, a configure aggregator state 1510, a discontinuity detection state 1515, specify new baseline state 1520, a update stats state 1525, a query storage state 1530, and a generate message state 1535. Not all operations have to be performed by the aggregator. For instance, the aggregator of some embodiments does not perform one or more of the operations, such as the configuration state 1510. Furthermore, several of the states may be performed by different components. For instance, the system of some embodiments includes a collector component that performs the query storage state 1530 and the generate message state 1535.

In the listening mode state 1505, the aggregator of some embodiments listens for messages from one or more flow stats exporters. As mentioned above, each flow stats exporter operating on a particular physical forwarding element (PFE) might send a report to the aggregator in a periodic basis.

If a message with stats has been received, the aggregator transitions to the discontinuity detection state 1515. At this state 1515, the aggregator detects whether there is a discontinuity in the received stats. In some embodiments, a discontinuity can occur when a stats counter went backwards, when duration associated with a sub-element or flow is less than a previously stored duration, or when the start time of the flow is off by more than a threshold period of time. In some embodiments, the discontinuity detection is performed so that aggregator does not calculate the delta between current discontinues flow and the previous flow. Meaning, if there is discontinuity, there is no real delta that the aggregator can add to the aggregate entity's counter(s).

In some embodiments, when there is no discontinuity detected, the aggregator transition to the update stats state 1525. At this update stats state 1525, the aggregator may calculate the difference between the previously stored stats and the received stats, and add the difference to aggregated stats. In some embodiments, the aggregator might store the received stats, along with its metadata (e.g., duration) in order to detect discontinuity in the next stats received from the same flow stats exporter. After updating the stats, the aggregator returns to the listening mode state 1505, in some embodiments.

In some embodiments, when there is discontinuity, the aggregator transition to the specify new baseline state 1520. At this state, the aggregator of some embodiments ignores the statistics that are discontinuous, and uses the statistics as a new baseline or as the last seen statistics. After specifying the new baseline, the aggregator of some embodiments returns to the listening mode state 1505.

In the listening mode state 1505, the aggregator of some embodiments listens for stats request messages. When a stats request message is receive, the aggregator transitions to the query storage state 1530. At this state 1530, the aggregator generates a query and queries the storage with the aggregated stats. The query may be generated using one or more tags (e.g., aggregation key) derived from the stats request message.

When the query results in the requested stats being retrieved from the storage, the aggregator transitions to the generate message state 1535. At this state, the aggregator generates a response message with the retrieved stats. If the query returns no stats, the aggregator may still transition to the generate message state. However, the message will not include the requested stats and/or include a note specifying that there are no stats results. In some embodiments, a stats request may include a request for statistics of a number of entities (e.g., aggregated entities). If the stats for one or more entities do not exist in the storage, the aggregator of some embodiments simply just responds by omitting the statistics of each entity that does not exist in the storage.

In the listening mode state 1605, the aggregator of some embodiments listens for configuration from a flow stats exporter. For example, a new flow stats exporter may be registered with the system to track entity statistics. When such a configuration message is received, the aggregator transitions to the configure aggregator state 1510. At this state, the aggregator may configure itself to listen for stats from the new flow stats exporter.

G. Discontinuity Detection

In some cases, there can be discontinuity between a current report and the aggregated stats. For instance, a stats counter may have went backwards. This can occur if a flow in a flow table or a cache has expired due to inactivity. If the same flow is reinstalled in the flow table or the cache, the stats of the flow are reset, and the report from the flow stats exporter will reflect that reset. To deal with such discontinuity, the aggregator of some embodiments stores not only the aggregated statistics but also the last seen statistics. In some embodiments, the last seen statistics is used to calculate the difference (or delta) that is added to the aggregated statistics. In some embodiments, when there is discontinuity with the stats report, the aggregator ignores the statistics that are discontinuous, and uses the statistics as a new baseline or as the last seen statistics.

In some embodiments, the aggregator retrieves the duration associated with a flow to detect discontinuity. For instance, if the duration in the current report is less that the duration from the previous report, the aggregator determines that there is discontinuity in the current stats report. Thereafter, the aggregator may ignore the statistics that are discontinuous, and use the statistics as a new baseline or as the last seen statistics.

The aggregator of some embodiments may also determine that the stats are discontinuous by calculating a start time for a given flow. The start time can be calculated by subtracting the duration from the dump time. The start time can be calculated for each report and compared. If the start time is off by more than a specified time period, the aggregator of some embodiments specifies that there is discontinuity in the current stats report. Here, the aggregator may also ignore the statistics in the current report, and use the statistics as a new baseline or as the last seen statistics.

In addition, when the flow for logical interfaces are tagged and aggregated, the statistics are considered discontinuous if any of the following conditions are satisfied: (1) any of the counters backwards for the new statistics received, or (2) the instance identifiers (e.g., UUIDs) are different for the new interface statistics received (i.e., same interface hash but different UUIDs).

The following are examples of pseudo codes used for discontinuity check for interfaces. When statistics are collected for interface, there are many more columns used for the interface statistics. The following examples first show what the full set of counters are, and then the key 'fake_counter' is used to represent all of the counters at once (assuming that all the counters are set to whatever the 'fake_counter' value is):

```
struct InterfaceStatsTableValue {
    uint64_t collisions;
    uint64_t rx_bytes;
    uint64_t rx_crc_err;
    uint64_t rx_dropped;
    uint64_t rx_errors;
    uint64_t rx_frame_err;
    uint64_t rx_over_err;
    uint64_t rx_packets;
    uint64_t tx_bytes;
    uint64_t tx_dropped;
    uint64_t tx_errors;
    uint64_t tx_packets;
    uint64_t last_updated_epoch_ms;
}
```

If fake_counter=123 in the examples below, it means that collisions=123, rx_bytes=123, etc. The initial state for the interface statistics table is as follows:

|ovs uuid|interface hash|fake_counter

The initial state for last seen OVS interface statistics table is as follows:

|ovs uuid|last seen interface statistics set

The following is an example of a pseudo code when two interface statistics are sent from the interface stats exporter on a single virtualization software:

```
ovs uuid (abc) ==> [
    (instance_uuid(interface A) -> hash(name(interface A)),
    fake_counter = 10),
    (instance_uuid(interface B) -> hash(name(interface B)),
    fake_counter = 2)
]
```

After the execution of the above pseudo code, the state for the interface statistics table will be as follows:

|ovs uuid|interface hash|fake_counter

After the execution of the above pseudo code, the state for the last seen OVS interface statistics table will be as follows:

| ovs uuid | last seen interface statistics set
| abc       | [(instance_uuid(interface A) -> hash(name(interface A)), fake_counter =
10), (instance_uuid(interface B) -> hash(name(interface B)), fake_counter = 2)]

As shown above, the interface statistics table does not contain any statistics yet. This is because the first baseline can be considered as discontinuous with "nothing".

The following is an example of a pseudo code when two interface statistics are sent again for a certain time period:

```
ovs uuid (abc) ==> [
    (instance_uuid(interface A) -> hash(name(interface A)),
    fake_counter = 20),
    (instance_uuid(interface B) -> hash(name(interface B)),
    fake_counter = 2)
]
```

After the execution of the above pseudo code, the state for the interface statistics table will be as follows:

| ovs uuid | interface hash | fake_counter |
|---|---|---|
| abc | hash(name(interface A)) | 10 |
| abc | hash(name(interface B)) | 0 |

After the execution of the above pseudo code, the state for the last seen OVS interface statistics table will be as follows:

| ovs uuid | last seen interface statistics set |
|---|---|
| abc | [(instance_uuid(interface A) -> hash(name(interface A)), fake_counter = 20), (instance_uuid(interface B) -> hash(name(interface B)), fake_counter = 2)] |

As expected, the continuation interface statistics cause the generation of a delta to add into (abc, hash(name(interface A))) and (abc, hash(name(interface B))). Since interface B didn't change, the delta is just 0.

The following is an example of a pseudo code when two interface statistics are sent again for a certain time period, but interface A is now discontinuous.

```
ovs uuid (abc) ==> [
    (instance_uuid'(interface A) -> hash(name(interface A)),
    fake_counter = 40),
    (instance_uuid(interface B) -> hash(name(interface B)),
    fake_counter = 5)
]
```

After the execution of the above pseudo code, the state for the interface statistics table will be as follows:

| ovs uuid | interface hash | fake_counter |
|---|---|---|
| abc | hash(name(interface A)) | 10 |
| abc | hash(name(interface B)) | 3 |

After the execution of the above pseudo code, the state for the last seen OVS interface statistics table will be as follows:

| ovs uuid | last seen interface statistics set |
|---|---|
| abc | [(instance_uuid'(interface A) -> hash(name(interface A)), fake_counter = 40), (instance_uuid(interface B) -> hash(name(interface B)), fake_counter = 5)] |

In this case, interface A's instance_uuid is different, which means that the new statistics is discontinuous, even though the counter value went up. This means that a delta for interface A cannot be calculated, therefore the statistics for (abc, hash(name(interface A))), remain unchanged. However interface B's counters went up and there was not a conflict. Now (abc, hash(name(interface B))) gets the current delta added onto it: (0+(5−2)).

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
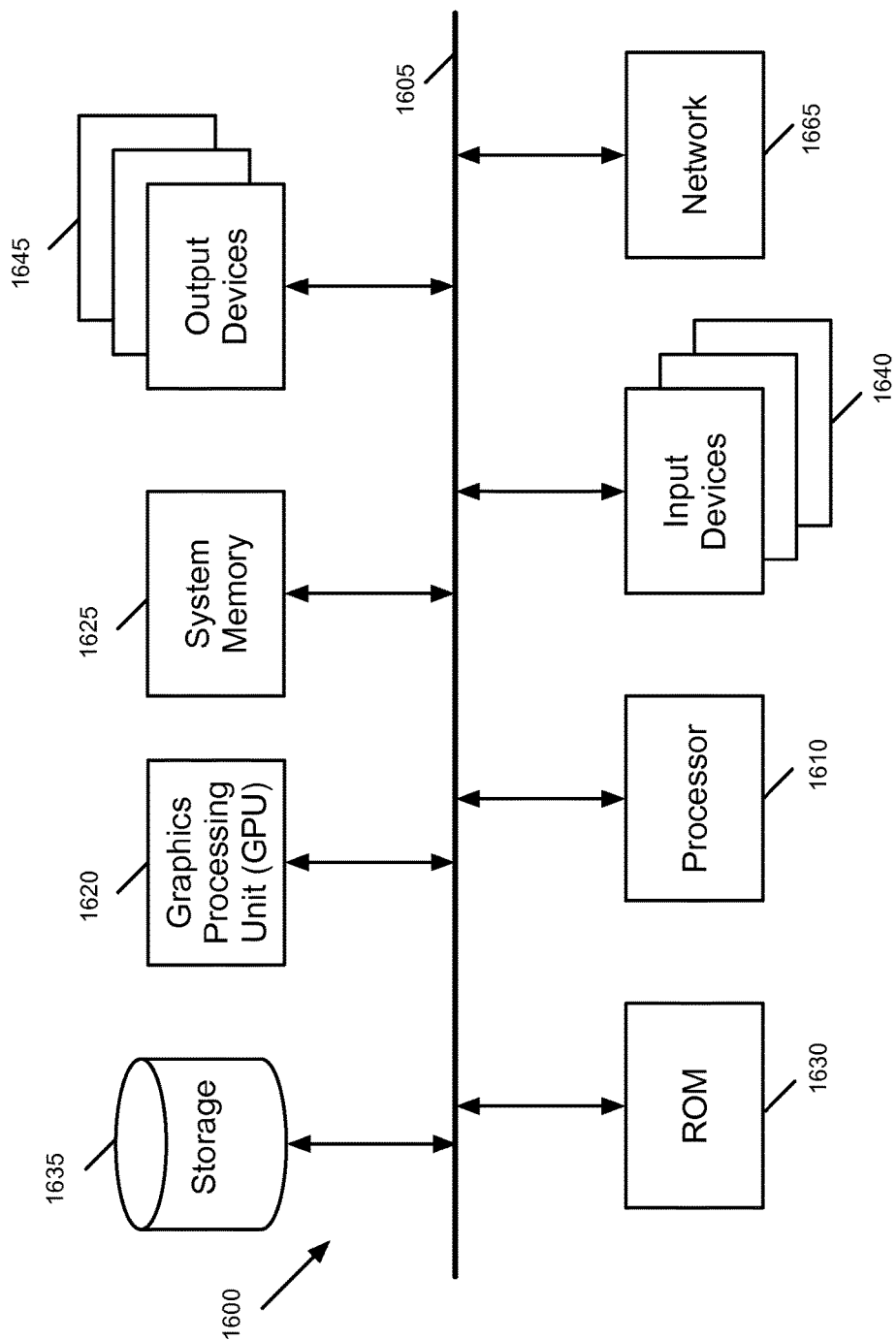
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1625 is a read-and-write memory device. However, unlike storage device 1635, the system memory 1625 is a volatile read-and-write memory, such a random access memory. The system memory 1625 stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 14 and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of aggregating statistics for a set of interfaces associated with a logical forwarding element (LFE), the method comprising:
   for each particular interface in the set of interfaces associated with the LFE, defining at least one flow entry comprising (i) a set of matching fields that store flow-identifying parameters for matching with attributes of packets and (ii) a tag identifier that identifies the particular interface and that is not part of a matching field to match with packet attributes;
   sending the flow entries to a plurality of physical forwarding elements (PFEs) that implement the LFE, at least a subset of the PFEs executing on host computers along with data compute nodes associated with the LFE;
   receiving, from the plurality of PFEs, statistics generated by each PFE for each flow entry that has a tag identifier; and
   aggregating the received statistics to produce overall statistics relating to each interface associated with the LFE.

2. The method of claim 1, wherein the statistics are received from the plurality of PFEs in a set time interval.

3. The method of claim 1, wherein aggregating the received statistics comprises adding a difference between the received statistics of each particular flow tagged with an identifier of an interface and previously received statistics of each particular flow.

4. The method of claim 1 further comprising detecting a discontinuity with the received statistics by reading a first statistics counter in currently received statistics and comparing the first statistics counter with a second statistics counter from a previously received statistics.

5. The method of claim 1 further comprising detecting a discontinuity with the received statistics by identifying a first duration associated with a flow in currently received statistics and determining whether the first duration is less than a second duration of the same flow in previously received statistics.

6. The method of claim 1 further comprising detecting a discontinuity with the received statistics by calculating a first start time of a flow in currently received statistics and comparing the first start time with a second start time of the same flow from previously received statistics.

7. The method of claim 1, wherein an interface comprises one of a virtual network interface card (VNIC) connecting a data compute node (DCN) that executes on a host computer to a forwarding element executing on the host, and an uplink interface connecting a physical network interface card (PNIC) to the forwarding element.

8. The method of claim 7, wherein the tag identifier of the interface is a universally unique identifier (UUID) of the interface.

9. The method of claim 8, wherein a tag identifier that identifies the particular interface comprises an identifier of a port connecting the interface to a physical or logical forwarding element.

10. A non-transitory machine readable medium storing a program that when executed by at least one processing unit aggregates statistics for a set of interfaces associated with a logical forwarding element (LFE), the program comprising sets of instructions for:
    for each particular interface in the set of interfaces associated with the LFE, defining at least one flow entry comprising (i) a set of matching fields that store flow-identifying parameters for matching with attributes of packets and (ii) a tag identifier that identifies the particular interface and that is not part of a matching field to match with packet attributes;
    sending the flow entries to a plurality of physical forwarding elements (PFEs) that implement the LFE, at least a subset of the PFEs executing on host computers along with data compute nodes associated with the LFE;
    receiving, from the plurality of PFEs, statistics generated by each PFE for each flow entry that has a tag identifier; and
    aggregating the received statistics to produce overall statistics relating to each interface associated with the LFE.

11. The non-transitory machine readable medium of claim 10, wherein the statistics are received from the plurality of PFEs in a plurality of time intervals.

12. The non-transitory machine readable medium of claim 10, wherein the program further comprises a set of instructions for detecting a discontinuity by reading a first statistics counter in currently received statistics and comparing the first statistics counter with a second statistics counter from previously received statistics.

13. The non-transitory machine readable medium of claim 10, wherein the program further comprises a set of instructions for storing the aggregated total statistics along with last seen statistics to detect a discontinuity, wherein when a discontinuity is detected in the received statistics, (i) the aggregated total statistics is not updated and (ii) the last seen statistics are replaced with the received statistics.

14. The non-transitory machine readable medium of claim 10, wherein an interface comprises one of a virtual network interface card (VNIC) connecting a data compute node (DCN) that executes on a host computer to a forwarding element executing on the host, and an uplink interface connecting a physical network interface card (PNIC) to the forwarding element.

15. The non-transitory machine readable medium of claim 10, wherein the tag identifier of the interface is a universally unique identifier (UUID) of the interface.

16. The non-transitory machine readable medium of claim 15, wherein a tag identifier that identifies the particular interface comprises an identifier of a port connecting the interface to a physical forwarding element.

17. The non-transitory machine readable medium of claim 10, wherein the program further comprises a set of instructions for generating a report regarding the statistics for display on a display screen.

18. The method of claim 1, wherein at least a plurality of tag identifiers for a plurality of flow entries are not packet header values.

19. The method of claim 1, wherein one interface is a logical port, while another interface is a logical port pair.

20. The method of claim 1, wherein an interface is a logical forwarding element.

* * * * *